United States Patent
Ye et al.

(10) Patent No.: US 12,299,901 B2
(45) Date of Patent: May 13, 2025

(54) SYSTEM AND METHOD FOR OCCLUSION DETECTION IN FRAME RATE UP-CONVERSION OF VIDEO DATA

(71) Applicant: Beijing Dajia Internet Information Technology Co., Ltd., Beijing (CN)

(72) Inventors: Shuiming Ye, San Diego, CA (US); Xianglin Wang, San Diego, CA (US); Yi-Wen Chen, San Diego, CA (US); Guoxin Jin, San Diego, CA (US); Shufei Fan, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 599 days.

(21) Appl. No.: 17/590,104

(22) Filed: Feb. 1, 2022

(65) Prior Publication Data
US 2022/0270267 A1  Aug. 25, 2022

Related U.S. Application Data

(60) Provisional application No. 63/153,528, filed on Feb. 25, 2021.

(51) Int. Cl.
*G06T 7/246* (2017.01)
*G06T 7/11* (2017.01)

(52) U.S. Cl.
CPC ............... *G06T 7/246* (2017.01); *G06T 7/11* (2017.01); *G06T 2207/10016* (2013.01)

(58) Field of Classification Search
CPC .. G06T 7/246; G06T 7/11; G06T 2207/10016
See application file for complete search history.

(56) References Cited

U.S. PATENT DOCUMENTS

| | | |
|---|---|---|
| 2011/0310295 A1* | 12/2011 | Chen .................... H04N 19/577 348/E7.003 |
| 2018/0374218 A1* | 12/2018 | Avidor .................... G06T 7/246 |
| 2020/0209896 A1* | 7/2020 | Kashikar ............. G06V 10/273 |

* cited by examiner

Primary Examiner — Myron Wyche
(74) Attorney, Agent, or Firm — Bayes PLLC

(57) ABSTRACT

Embodiments of the disclosure provide systems and methods for performing occlusion detection in frame rate up-conversion of video data including a sequence of image frames. The method includes determining, by a video processor, whether a target block of a target frame is a potential occlusion block based on at least one of motion vector information or distortion metric information associated with the target block. The target frame is to be generated and interpolated into the sequence of image frames. Responsive to the target block being the potential occlusion block, the method further includes detecting, by the video processor, an occlusion type of the target block. The method additionally includes generating, by the video processor, the target block by performing a motion compensation method adaptively selected based on the occlusion type of the target block.

20 Claims, 11 Drawing Sheets

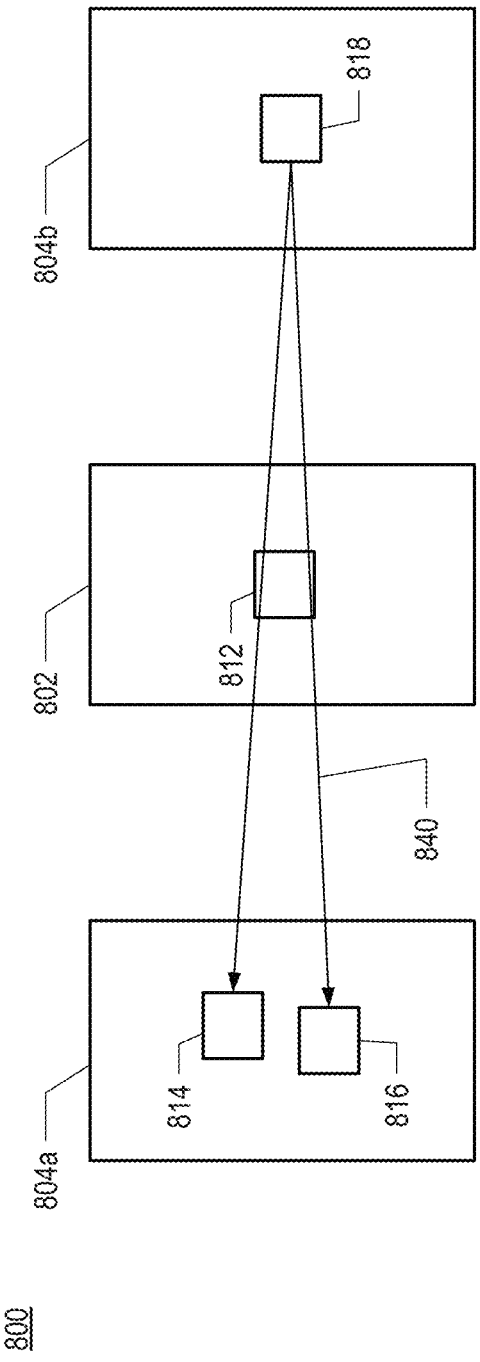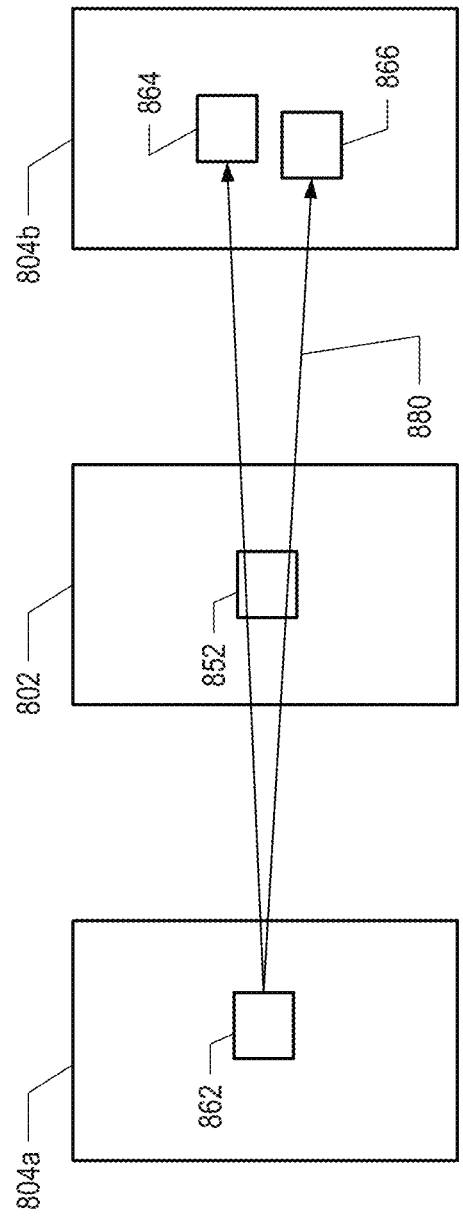

SYSTEM AND METHOD FOR OCCLUSION DETECTION IN FRAME RATE UP-CONVERSION OF VIDEO DATA

CROSS REFERENCE TO RELATED APPLICATION

This application claims the benefit of priority under 35 USC § 119(e) to U.S. Application No. 63/153,528, filed on Feb. 25, 2021, entitled "OCCLUSION DETECTION FOR FRAME RATE UP CONVERSION," which is hereby incorporated by reference in its entirety.

TECHNICAL FIELD

The present disclosure relates to the field of video processing, and more particularly relates to methods and systems for detecting and handling occlusion regions in image frames of videos for frame rate up-conversion (FRUC) of the videos.

BACKGROUND

FRUC can be applied to improve visual quality of video data by converting an input video with a lower frame rate to an output video with a higher frame rate. For example, an input video with 30 frames per second (fps) can be converted into an output video with 60 fps, 120 fps, or another higher frame rate. Compared to the input video, the output video with a higher frame rate may present smoother motion and provide a more pleasant viewing experience for a user.

FRUC can also be useful in low bandwidth applications. For example, some frames in a video may be dropped in an encoding process at a transmitter side so that the video can be transmitted with a lower bandwidth. Afterwards, the dropped frames can be re-generated through interpolation during a decoding process at a receiver side. For example, a frame rate of the video may be reduced by half by dropping every other frame in the encoding process at the transmitter side, and then at the receiver side, the frame rate may be recovered through frame interpolation using FRUC.

Existing FRUC methods can be mainly classified into three categories. The first category of methods interpolates additional frames using a number of received video frames without taking the complex motion model into account. The frame repetition method and the frame averaging methods are two typical examples of this category. In the frame repetition method, the frame rate is increased by simply repeating or duplicating the received frames. In the frame averaging method, additional frames are interpolated by weighted averaging of multiple received frames. Given the simplistic processing of these methods, the drawbacks of these methods are also obvious which include the production of motion jerkiness or blurring of moving objects when the video content contains moving objects with complex motion. The second category, the so-called motion compensated FRUC (MC-FRUC), is more advanced in that it utilizes the motion information to perform the motion compensation (MC) to generate the interpolated frames. The third category utilizes neural network. For example, through neural network and deep learning, a synthesis network may be trained and developed to produce interpolated frames. Motion field information, which is derived using either the conventional motion estimation or the deep learning-based approaches, may also be fed into the neural network for frame interpolation.

Occlusion detection and handling may be the most challenging part for existing FRUC methods. In conventional MC-FRUC, when pixels and/or blocks of interpolated frames are in occlusion regions, no matching reference pixels and/or blocks can be found between a previous reference frame and a next reference frame through motion estimation. As a result, motion vectors derived through bilateral motion estimation are often incorrect, and artifacts may appear when such incorrect motion vectors are directly used for interpolation. It can be a challenge to correctly detect the occlusion regions in the interpolated frames and to determine appropriate motion vectors for these occlusion regions such that motion compensation can be performed effectively for the video data.

This disclosure provides improved methods and systems for occlusion detection and occlusion handling in FRUC of video data.

SUMMARY

Embodiments of the disclosure provide a method for performing occlusion detection in frame rate up-conversion of video data including a sequence of image frames. The method may include determining, by a video processor, whether a target block of a target frame is a potential occlusion block based on at least one of motion vector information or distortion metric information associated with the target block. The target frame is to be generated and interpolated into the sequence of image frames. Responsive to the target block being the potential occlusion block, the method may further include detecting, by the video processor, an occlusion type of the target block. The method may additionally include generating, by the video processor, the target block by performing a motion compensation method adaptively selected based on the occlusion type of the target block.

Embodiments of the disclosure also provide a system for performing occlusion detection in frame rate up-conversion of video data including a sequence of image frames. The system may include a memory configured to store the sequence of image frames. The system may further include a video processor configured to determine whether a target block of a target frame is a potential occlusion block based on at least one of motion vector information or distortion metric information associated with the target block. The target frame is to be generated and interpolated into the sequence of image frames. Responsive to the target block being the potential occlusion block, the video processor may be further configured to detect an occlusion type of the target block. The video processor may be additionally configured to generate the target block by performing a motion compensation method adaptively selected based on the occlusion type of the target block.

Embodiments of the disclosure also provide a non-transitory computer-readable storage medium configured to store instructions which, when executed by a video processor, cause the video processor to perform a process for performing occlusion detection in frame rate up-conversion of video data including a sequence of image frames. The process may include determining whether a target block of a target frame is a potential occlusion block based on at least one of motion vector information or distortion metric information associated with the target block. The target frame is to be generated and interpolated into the sequence of image frames. Responsive to the target block being the potential occlusion block, the process may further include detecting an occlusion type of the target block. The process may additionally include generating the target block by performing a motion compensation method adaptively selected based on the occlusion type of the target block.

Both the foregoing general description and the following detailed description are exemplary and explanatory only and are not restrictive of the invention, as claimed.

BRIEF DESCRIPTION OF THE DRAWINGS

FIG. 8A is a graphical representation illustrating a forward motion estimation process, according to embodiments of the disclosure.

FIG. 8B is a graphical representation illustrating a backward motion estimation process, according to embodiments of the disclosure.

DETAILED DESCRIPTION

Figure 1:
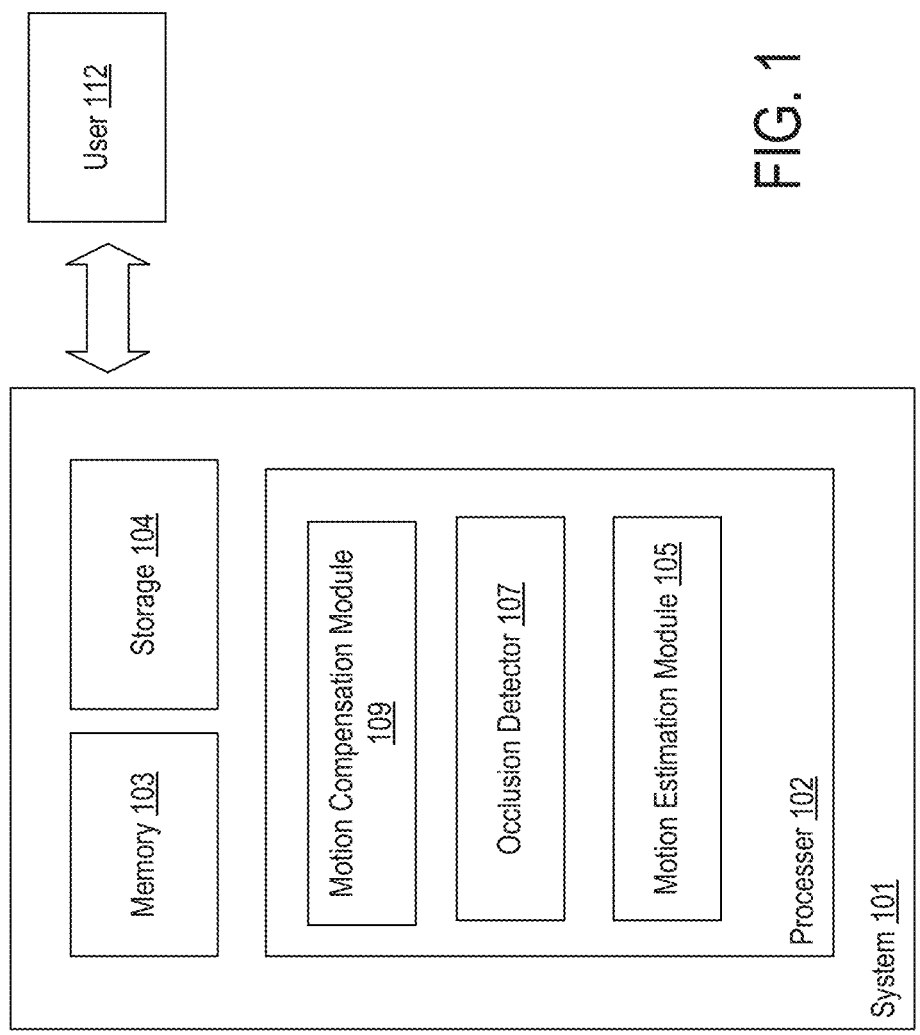
FIG. 1 illustrates a block diagram of an exemplary system for performing FRUC of video data, according to embodiments of the disclosure.

Reference will now be made in detail to the exemplary embodiments, examples of which are illustrated in the accompanying drawings. Wherever possible, the same reference numbers will be used throughout the drawings to refer to the same or like parts.

MC-FRUC techniques may include interpolating additional frames into the video using motion compensation of moving objects. Motion information of the moving objects may be utilized to perform the motion compensation such that interpolated frames can be generated to more smoothly show the motion. Generally, a MC-FRUC system may include a motion estimation module, an occlusion detector, and a motion compensation module. The motion estimation module may determine motion vectors of an interpolated frame (also referred to as a target frame herein) relative to one or more reference frames based on a distortion metric. The occlusion detector may detect whether an occlusion scenario occurs in the target frame. Responsive to detecting that the occlusion scenario occurs, the occlusion detector may determine an occlusion region where the occlusion scenario occurs in the target frame.

In some implementations, through motion trajectory tracking, the occlusion detector may detect a normal (non-occluded) region, an occlusion region, or both, in the target frame. The motion compensation module may generate image content (or pixel values) for the non-occluded region by referencing both of a previous frame (a reference frame preceding the target frame and a next frame (a reference frame subsequent to the target frame). The occlusion region can include, for example, a covered occlusion region, an uncovered occlusion region, or a combined occlusion region. For each of the covered occlusion region and the uncovered occlusion region, the motion compensation module may generate image content (or pixel values) for the region in the target frame by referencing either the previous or next frame. To reduce blocking artifacts and improve visual quality, an overlapped block motion compensation (OBMC) technique may also be used. It is contemplated that the term "uncovered region" used herein may refer to a newly revealed region of the target frame, instead of a normal region that is not covered. A target block in the target frame may refer to an image block of the target frame including a plurality of pixels in the target frame.

For example, a region (e.g., including a number of pixels or one or more image blocks of pixels in the target frame) covered by one or more other objects in the next frame may be detected as a "covered" region. Therefore, no matched reference pixels (or no matched reference blocks of pixels) for the region can be found in the next frame using a bilateral motion estimation. That is, for each target block in the region, no matched reference block can be found for the target block from the next frame. However, a matched reference block can be found for the target block in the region from the previous frame and can be used for motion compensation of the target block.

In another example, a region in the target frame covered in the previous frame but revealed in the next frame may be detected as an "uncovered" region. Therefore, no matched reference pixels (or no matched reference blocks of pixels) for the region can be found in the previous frame using a bilateral motion estimation. That is, for each target block in the region, no matched reference block can be found for the target block from the previous frame. However, a matched reference block can be found for the target block in the region from the next frame and can be used for motion compensation of the target block.

In still another example, a region covered (not revealed) in both the previous frame and the next frame may be detected as a combined region (e.g., a "covered-and-uncovered" region). For example, the region is covered by one or more first objects in the previous frame and also covered by one or more second objects in the next frame, such that the region is not revealed in both the previous frame and the next frame. Therefore, no matched reference pixels (or no matched reference blocks of pixels) for the region can be found in either the previous frame or the next frame. That is, for each target block in the region, no matched reference block can be found for the target block from either the previous frame or the next frame. In this case, additional processing may be needed for interpolating pixels in the target block. For example, a hole filling method such as spatial interpolation (e.g., image inpainting) may be used to fill in the target block.

In some implementations, a target block in a covered region may be referred to as a covered target block. A target block in an uncovered region may be referred to as an uncovered target block. A target block in a combined region may be referred to as a combined (or "covered-and-uncovered") target block. In some implementations, if a target block has a first matched reference block from a previous frame and a second matched reference block from a next frame, a motion vector of the target block may be referred to as a bi-directional motion vector. If the target block has a matched reference block from the previous frame but no matched reference block can be found in the next frame, a motion vector of the target block may be referred to as a unidirectional motion vector. Similarly, if the target block has a matched reference block from the next frame but no matched reference block can be found in the previous frame, a motion vector of the target block may also be referred to as a unidirectional motion vector.

It is contemplated that occlusion regions in the target frame may need to be detected and classified, so that correct motion vectors (as well as correct reference blocks) can be selected and used in motion compensation of the target blocks in the occlusion regions. For example, for the target blocks in the occlusion regions, unidirectional motion vectors can be selected and applied in motion compensation to avoid artifacts. However, it is not trivial to correctly detect the occlusion regions and determine appropriate motion vectors for the occlusion regions. For example, motion jerkiness or blurring of moving objects can be incurred in the video if the detected occlusion regions of the target frame are not correct and/or the determined motion vectors for the occlusion regions are not appropriate. A video viewing experience can be degraded due to the motion jerkiness or blurring of the moving objects. Thus, a proper handling of the occlusion regions in the target frame can be a challenge in FRUC to improve a visual quality of the video data.

In this disclosure, systems and methods for detecting and classifying an occlusion region of a target frame during a FRUC process are disclosed. More specifically, a potential occlusion region in the target frame may be detected based on at least one of motion vector information or distortion metric information obtained in a motion estimation process. An occlusion type (e.g., covered, uncovered, combined, or normal) may be identified for each target block in the potential occlusion region based on a motion vector projection process. For each occlusion type, an adaptive motion compensation method may be used to generate target blocks of the occlusion type to avoid interpolation artifacts and enhance video quality.

For example, for target blocks of different occlusion types, motion vectors obtained using different motion estimation processes can be selected as winner motion vectors for the target blocks, respectively. Then, reference blocks for the target blocks can be found in a previous frame, a next frame, or both, based on the winner motion vectors of the target blocks, respectively. For example, two matched reference blocks may be found for a non-occluded target block from the previous frame and the next frame, respectively; a matched reference block may be found for a covered target block from the previous frame; a matched reference block may be found for an uncovered target block from the next frame; or two collocated reference blocks may be found for a combined target block from the previous frame and the next frame, respectively. As a result, image content (or pixels) of the target blocks can be generated based on the reference blocks of the target blocks, respectively. As a result, potential motion jerkiness or blurring of moving objects can be reduced or eliminated in the video data. A visual quality of the video data can be improved.

Consistent with the disclosure, the systems and methods disclosed herein can improve a video presentation capability of a video processor (or video processing computer). Thus, a video viewing experience provided through the video processor (or video processing computer), or through a display coupled to the video processor (or video processing computer), can be enhanced. For example, by reducing potential motion jerkiness or blurring of moving objects that can incur during FRUC, a video display quality can be improved. Motion artifacts can be reduced in the video data such that the processor (or computer) can display a video with smoother motion.

Consistent with the disclosure, the systems and methods disclosed herein provide specific, detailed solutions for improving the video display quality when FRUC is applied. Specifically, through a series of operations including (1) detecting an occlusion region based on at least one of motion vector information or distortion metric information, (2) performing an occlusion-region classification based on a motion vector projection, and (3) performing adaptive motion compensation based on an occlusion type of each occlusion region, the detection and handling of occlusion regions in the target frame can be improved (or refined). Further description for the specific, detailed solutions for improving the video display quality when FRUC is applied is provided below in more detail.

Consistent with the disclosure, a distortion metric associated with a motion vector of a target block used herein may include, but not limited to, the following: a sum of absolute differences (SAD) metric, a mean square error (MSE) metric, or a mean absolute distortion (MAD) metric. Then, a distortion metric value (also referred to as a "metric value" herein) associated with the motion vector of the target block may include a SAD value, a MSE value, or a MAD value. For example, during a motion estimation process, two reference blocks associated with the motion vector of the target block can be obtained from a previous frame and a next frame, respectively, by projecting the target block onto the previous frame and the next frame using the motion vector. The distortion metric may be used to measure a distortion (or a similarity) between the two reference blocks associated with the motion vector, such that the distortion metric value can be calculated as a SAD value, a MSE value, or a MAD value between the two reference blocks. The distortion metric (or the distortion metric value) can be used to indicate an accuracy of the motion vector of the target block derived from the motion estimation process. For example, a smaller distortion metric value may indicate a lower distortion between the two reference blocks (or a higher similarity between the two reference blocks), which may indicate a higher accuracy of the motion vector of the target block derived from the motion estimation process.

FIG. 1 illustrates a block diagram 100 of an exemplary system 101 for performing occlusion detection in FRUC of video data, according to embodiments of the disclosure. In some embodiments, system 101 may be embodied on a device that a user 112 can interact with. For example, system 101 may be implemented on a server (e.g., a local server or a cloud server), a working station, a play station, a desktop computer, a laptop computer, a tablet computer, a smartphone, a game controller, a wearable electronic device, a television (TV) set, or any other suitable electronic device.

In some embodiments, system 101 may include at least one processor, such as a processor 102, at least one memory, such as a memory 103, and at least one storage, such as a storage 104. It is contemplated that system 101 may also include any other suitable components for performing functions described herein.

In some embodiments, system 101 may have different modules in a single device, such as an integrated circuit (IC) chip, or separate devices with dedicated functions. For example, the IC may be implemented as an application-specific integrated circuit (ASIC) or a field-programmable gate array (FPGA). In some embodiments, one or more components of system 101 may be located in a cloud computing environment or may be alternatively in a single location or distributed locations. Components of system 101 may be in an integrated device or distributed at different locations but communicate with each other through a network (not shown in the figure).

Processor 102 may include any appropriate type of microprocessor, graphics processor, digital signal processor, or microcontroller suitable for video processing. Processor 102 may include one or more hardware units (e.g., portion(s) of an integrated circuit) designed for use with other components or to execute part of a video processing program. The program may be stored on a computer-readable medium, and when executed by processor 102, it may perform one or more functions. Processor 102 may be configured as a separate processor module dedicated to performing FRUC. Alternatively, processor 102 may be configured as a shared processor module for performing other functions unrelated to performing FRUC.

In some embodiments, processor 102 can be a specialized processor (e.g., a video processor) customized for video processing. For example, processor 102 can be a graphics processing unit (GPU), which is a specialized electronic circuit designed to rapidly manipulate and alter memory to accelerate the creation of images in a frame buffer intended for output to a display device. Functions disclosed herein can be implemented by the GPU. In another example, system 101 can be implemented in a system on chip (SoC), and processor 102 may be a media and pixel processing (MPP) processor configured to run video encoder or decoder applications. In some embodiments, functions disclosed herein can be implemented by the MPP processor.

Processor 102 may include several modules, such as a motion estimation module 105, an occlusion detector 107, and a motion compensation module 109. Although FIG. 1 shows that motion estimation module 105, occlusion detector 107, and motion compensation module 109 are within one processor 102, they may be likely implemented on different processors located closely or remotely with each other.

Motion estimation module 105, occlusion detector 107, and motion compensation module 109 (and any corresponding sub-modules or sub-units) can be hardware units (e.g., portions of an integrated circuit) of processor 102 designed for use with other components or software units implemented by processor 102 through executing at least part of a program. The program may be stored on a computer-readable medium, such as memory 103 or storage 104, and when executed by processor 102, it may perform one or more functions.

Memory 103 and storage 104 may include any appropriate type of mass storage provided to store any type of information that processor 102 may need to operate. For example, memory 103 and storage 104 may be a volatile or non-volatile, magnetic, semiconductor-based, tape-based, optical, removable, non-removable, or other type of storage device or tangible (i.e., non-transitory) computer-readable medium including, but not limited to, a ROM, a flash memory, a dynamic RAM, and a static RAM. Memory 103 and/or storage 104 may be configured to store one or more computer programs that may be executed by processor 102 to perform functions disclosed herein. For example, memory 103 and/or storage 104 may be configured to store program(s) that may be executed by processor 102 to perform FRUC. Memory 103 and/or storage 104 may be further configured to store information and data used by processor 102.

Figure 2A:
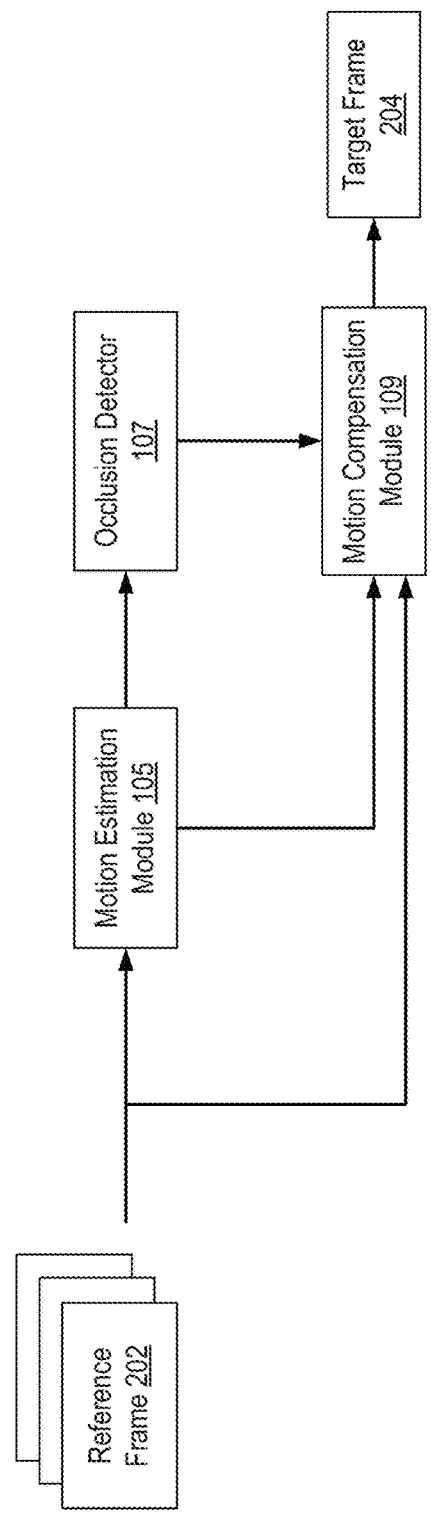
FIG. 2A illustrates a flow diagram of an exemplary process for performing FRUC of video data, according to embodiments of the disclosure.
Figure 2B:
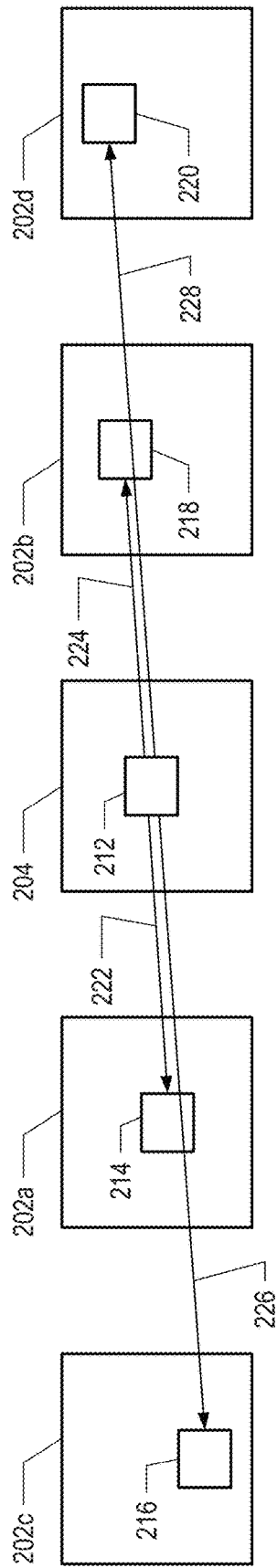
FIG. 2B is a graphical representation illustrating an interpolation process of a target frame based on a plurality of reference frames, according to embodiments of the disclosure.

FIG. 2A illustrates a flow diagram of an exemplary process 200 for performing FRUC of video data, according to embodiments of the disclosure. FIG. 2B is a graphical representation illustrating an interpolation process 250 of a target frame based on a plurality of reference frames, according to embodiments of the disclosure. The video data may include a sequence of image frames, and a target frame 204 may be an interpolated frame to be inserted into the sequence of image frames. With combined reference to FIGS. 2A-2B, target frame 204 may be generated using a plurality of reference frames 202. The plurality of reference frames 202 may include a plurality of original image frames in the video data that can be used for the generation and interpolation of target frame 204.

For example, as shown in FIG. 2B, the plurality of reference frames 202 may include a first previous frame 202a preceding target frame 204, a first next frame 202b subsequent to target frame 204, a second previous frame 202c preceding first previous frame 202a, and a second next frame 202d subsequent to first next frame 202b. Although four reference frames are shown in FIG. 2B, the number of reference frames used for the generation and interpolation of target frame 204 may vary depending on a specific application. Target frame 204 can be temporally located at a position with a display order (or time stamp) of i, where i is a positive integer. Second previous frame 202c, first previous frame 202a, first next frame 202b, and second next frame 202d may be located at positions with display orders of i−3, i−1, i+1, and i+3, respectively. Although not shown in FIG. 2B, additional target frames may also be interpolated at positions with display orders of i−4, i−2, i+2, i+4, etc., respectively.

In some embodiments, target frame 204 may be divided into a plurality of target blocks with a size of N×M pixels per block, where N and M are positive integers. N indicates the number of pixels along a vertical direction in a target block, and M indicates the number of pixels along a horizontal direction in the target block. In some embodiments, each of the plurality of target blocks may have a variable block size (e.g., the block size is not fixed and can be varied depending on a specific application). Similarly, each reference frame 202 may be divided into a plurality of reference blocks with a size of N×M pixels per block.

Referring back to FIG. 2A, motion estimation module 105 may be configured to receive the plurality of reference frames 202 and determine a set of motion vectors for target frame 204 relative to the plurality of reference frames 202. Specifically, for each target block in target frame 204, motion estimation module 105 may determine a plurality of motion vectors of the target block relative to the plurality of reference frames 202, respectively.

For example, referring to FIG. 2B, for a target block 212 of target frame 204, motion estimation module 105 may determine a motion vector 222 of target block 212 relative to first previous frame 202a and a motion vector 224 of target block 212 relative to first next frame 202b using an exemplary motion estimation process described below with reference to FIG. 7, 8A, or 8B. Alternatively or additionally, motion estimation module 105 may also determine a motion vector 226 of target block 212 relative to second previous frame 202c and a motion vector 228 of target block 212 relative to second next frame 202d.

Referring back to FIG. 2A, for each target block of target frame 204, motion estimation module 105 may determine at least one of motion vector information or distortion metric information associated with the target block. The motion vector information may include a winner motion vector of the target block, and the distortion metric information may include a winner metric value associated with the winner motion vector. The winner metric value may include, for example, a SAD value, a MSE value, or a MAD value associated with the winner motion vector.

Specifically, motion estimation module 105 may apply a set of motion estimation processes to determine a candidate set of motion vectors of the target block (e.g., relative to a previous frame and/or a next frame) and to determine a set of metric values associated with the candidate set of motion vectors, respectively. The previous frame can be, for example, first previous frame 202a, second previous frame 202c, or any other reference frame preceding target frame 204. The next frame can be, for example, first next frame 202b, second next frame 202d, or any other reference frame after target frame 204.

For example, motion estimation module 105 may determine a first motion vector of the target block (e.g., relative to the previous frame and/or the next frame) and a first metric value associated with the first motion vector using a bilateral motion estimation process. Motion estimation module 105 may also determine a second motion vector of the target block (e.g., relative to the previous frame and/or the next frame) and a second metric value associated with the second motion vector using a forward motion estimation process. Motion estimation module 105 may additionally determine a third motion vector of the target block (e.g., relative to the previous frame and/or the next frame) and a third metric value associated with the third motion vector using a backward motion estimation process. The candidate set of motion vectors may include the first, second, and third motion vectors of the target block. The set of metric values may include the first, second, and third metric values associated with the first, second, and third motion vectors, respectively.

Next, motion estimation module 105 may identify, based on the set of metric values, a winner motion vector from the candidate set of motion vectors and a winner metric value associated with the winner motion vector. For example, motion estimation module 105 may determine a minimal metric value from the set of metric values. Motion estimation module 105 may identify the winner motion vector to be a motion vector associated with the minimal metric value from the candidate set of motion vectors. Motion estimation module 105 may also identify the winner metric value to be the minimal metric value. An exemplary process for determining a winner motion vector and a winner metric value associated with an exemplary target block is illustrated below with reference to FIG. 9.

In some embodiments, motion estimation module 105 may also determine a bilateral metric value associated with the target block based on the winner motion vector. Specifically, motion estimation module 105 may apply the winner motion vector in a bilateral manner to obtain a previous mirroring block for the target block from the previous frame and a next mirroring block for the target block from the next frame. The previous mirroring block and the next mirroring block may be two reference blocks from the previous frame and the next frame, respectively, where the two reference blocks are along a motion trajectory of the winner motion vector using the target block as a central point in the motion trajectory. Motion estimation module 105 may determine the bilateral metric value based on the previous mirroring block and the next mirroring block. For example, the bilateral metric value may be calculated as a metric value (e.g., a SAD value) between the previous mirroring block and the next mirroring block.

In some embodiments, the distortion metric information associated with the target block may also include the bilateral metric value associated with the target block. An exemplary process for determining a bilateral metric value associated with an exemplary target block is illustrated below with reference to FIG. 9.

For each target block of target frame 204, occlusion detector 107 may be configured to receive at least one of motion vector information or distortion metric information associated with the target block. Occlusion detector 107 may perform potential occlusion detection for target frame 204 based on at least one of the motion vector information or the distortion metric information of each target block, as described below in more detail.

Generally, occlusion regions in a target frame are around a moving object, with a covered region located in the front of the moving object and an uncovered region located behind the moving object. In some embodiments, occlusion detector 107 may detect a potential occlusion region in target frame 204 based on motion vectors and/or metric values obtained from motion estimation. Specifically, a potential occlusion region may be detected by checking each target block's motion vectors and associated metric values to find out if they are inconsistent with that of neighboring blocks. The neighboring blocks may be neighbor image blocks surrounding the target block in the same target frame. The motion vectors and associated metric values may be derived from a bilateral motion estimation process, a forward motion estimation process, or a backward motion estimation process. The rationale behind this approach is that motion vectors in a small neighborhood of occlusion regions may be associated with different objects, e.g., with some objects associated with a first motion vector representing foreground motion and some objects associated with a second motion vector representing background motion, and therefore the first and second motion vectors are likely inconsistent. Similarly, associated metric values for occlusion regions may be larger than that of a non-occluded region, since true matched blocks for the occlusion regions may not exist in the reference frames.

For each target block of target frame 204, occlusion detector 107 may be configured to determine whether the target block is a potential occlusion block based on at least one of motion vector information or distortion metric information associated with the target block. The motion vector information may include a winner motion vector of the target block, and the distortion metric information may include a winner metric value and a bilateral metric value associated with the winner motion vector.

In some embodiments, occlusion detector 107 may determine whether the target block is a potential occlusion block based on the distortion metric information associated with the target block. Specifically, occlusion detector 107 may determine whether a metric difference between the bilateral metric value and the winner metric value is greater than a metric threshold. Responsive to the metric difference being greater than the metric threshold, occlusion detector 107 may determine that the target block is a potential occlusion block. Otherwise, occlusion detector 107 may determine that the target block is a normal target block (e.g., a non-occluded target block).

For example, when there is a large difference between the bilateral metric value and the winner metric value, the target block is likely to be an occlusion block, as illustrated by the following expression (1):

$$\text{block\_type} = \begin{cases} \text{occlusion} & \text{if } ctSAD - winSAD > TH_1 \\ \text{normal} & \text{otherwise} \end{cases} \quad (1)$$

In the above expression (1), $TH_1$ denotes a value of the metric threshold, and can be predetermined by a user or system 101 of FIG. 1. block_type denotes a classification of the target block. An "occlusion" result may represent a case that a matched reference block of the target block may be found in either the previous frame or the next frame, but not in both. Alternatively, the "occlusion" result may represent a case that no matched reference block of the target block can be found in either the previous frame or the next frame. A "normal" result may represent a case that two matched reference blocks of the target block may be found in the previous frame and the next frame, respectively (i.e., there is no occlusion). ctSAD denotes the bilateral metric value, and winSAD denotes the winner metric value.

In some embodiments, occlusion detector 107 may determine whether the target block is a potential occlusion block based on the motion vector information associated with the target block. Specifically, occlusion detector 107 may determine one or more motion vectors of one or more neighboring blocks associated with the target block. Occlusion detector 107 may determine one or more distance values between the winner motion vector of the target block and the one or more motion vectors of the one or more neighboring blocks, respectively. Occlusion detector 107 may determine a maximal value of the one or more distance values, and may determine whether the maximal value is greater than a distance threshold. Responsive to the maximal value of the one or more distance values being greater than the distance threshold, occlusion detector 107 may determine that the target block is a potential occlusion block. Otherwise, occlusion detector 107 may determine that the target block is a normal target block.

For example, if the winner motion vector of the target block is substantially different from motion vectors of the neighboring blocks, there is a high likelihood that the target block belongs to an occlusion region. Based on this rationale, the target block may be classified to be a potential occlusion block or a normal block using the following expression (2):

$$\text{block\_type} = \begin{cases} \text{occlusion} & \text{if } \max_{i \in N} dist(winMV, MV_i) > TH_2 \\ \text{normal} & \text{otherwise} \end{cases} \quad (2)$$

In the above expression (2), dist denotes a distance function between two motion vectors winMV and $MV_i$. $MV_i$ denotes a motion vector of a neighboring block i, and winMV denotes the winner motion vector of the target block. N denotes a set of neighboring blocks, with $1 \leq i \leq N$. $TH_2$ denotes a value of the distance threshold, and can be predetermined by a user or system 101 of FIG. 1.

In some embodiments, the motion vector information may also be used together with the distortion metric information to determine whether the target block is a potential occlusion block. For example, occlusion detector 107 may determine whether the target block is a potential occlusion block based on the motion vector information and the distortion metric information using the following expression (3):

$$\text{block\_type} = \begin{cases} \text{occlusion} & \text{if } ctSAD - winSAD > TH_1 \text{ or } \max_{i \in N} dist(winMV, MV_i) > TH_2 \\ \text{normal} & \text{otherwise} \end{cases} \quad (3)$$

For example, if the metric difference (e.g., ctSAD−winSAD) between the bilateral metric value and the winner metric value is greater than the metric threshold $TH_1$, or if the maximal value $$\left(\text{e.g., } \max_{i \in N} dist(winMV, MV_i)\right)$$

of the one or more distance values between the winner motion vector of the target block and the one or more motion vectors of the one or more neighboring blocks is greater than the distance threshold $TH_2$, occlusion detector 107 may determine that the target block is a potential occlusion block. Otherwise, occlusion detector 107 may determine that the target block is a normal target block.

By performing similar operations for each target block in target frame 204, occlusion detector 107 may determine a potential occlusion region of target frame 204. The potential occlusion region may include one or more potential occlusion blocks.

For each target block in the potential occlusion region (e.g., for each potential occlusion block), occlusion detector 107 may be configured to detect an occlusion type of the target block based on a motion vector projection of the target block onto the previous frame and the next frame. For example, occlusion detector 107 may determine that the target block is one of a covered, uncovered, combined, or normal target block.

Specifically, using a motion vector of the target block, occlusion detector 107 may project the target block onto the previous frame and the next frame to obtain a previous projected block and a next projected block, respectively. Occlusion detector 107 may detect an occlusion type of the target block based on a motion vector of the target block, a motion vector of the previous projected block, and a motion vector of the next projected block. The motion vector of the target block may be a winner motion vector or any other suitable motion vector of the target block obtained using a motion estimation process. The motion vector of the previous projected block can be a winner motion vector or any other suitable motion vector of the previous projected block determined using a motion estimation process. Similarly, the motion vector of the next projected block can be a winner motion vector or any other suitable motion vector of the next projected block determined using a motion estimation process. An exemplary process for determining motion vectors of the previous and next projected blocks is illustrated below in FIG. 10B.

For example, through a motion vector projection, occlusion detector 107 may classify each target block in the potential occlusion region into a covered target block, an uncovered target block, a combined (covered-and-uncovered) target block, or a normal target block. In the motion vector projection, occlusion detector 107 may project the target block onto the previous frame and the next frame using the motion vector of the target block, respectively, and may obtain a previous projected block in the previous frame and a next projected block in the next frame, respectively. Occlusion detector 107 may compare a motion vector of the target block with a motion vector of the previous projected block and a motion vector of the next projected block. Occlusion detector 107 may detect an occlusion type for the target block based on a comparison result of the motion vector of the target block, the motion vector of the previous projected block, and the motion vector of the next projected block.

It is contemplated that the same object in different image frames may have similar motion vectors. If the previous or next projected block has a motion vector similar to that of the target block, the previous or next projected block may be classified into a same object (i.e., foreground or background) as the target block. Otherwise, the previous or next projected block may be classified into a different object from the target block.

Consistent with the disclosure herein, if two motion vectors are similar, a distance between the two motion vectors is smaller than a lower distance threshold. For example, an angle difference and a magnitude difference of the two motion vectors is smaller than a predetermined lower angle threshold and a predetermined lower magnitude threshold, respectively. If two motion vectors are substantially different from each other, a distance between the two motion vectors is greater than an upper distance threshold. For example, an angle difference and a magnitude difference of the two motion vectors are greater than a predetermined upper angle threshold and a predetermined upper magnitude threshold, respectively. The predetermined lower angle threshold and the predetermined lower magnitude threshold are smaller than the predetermined upper angle threshold and the predetermined upper magnitude threshold, respectively.

In some embodiments, if the previous projected block in the previous frame has a motion vector similar to that of the target block, and the next projected block in the next frame has a motion vector substantially different from that of the target block, occlusion detector 107 may determine that the target block is a covered target block. Alternatively, if the previous projected block has a motion vector substantially different from that of the target block, and the next projected block has a motion vector similar to that of the target block, occlusion detector 107 may determine that the target block is an uncovered target block. Alternatively, if both the previous projected block and the next projected block have motion vectors similar to that of the target block, occlusion detector 107 may determine that the target block is a normal target block. Alternatively, if both the previous projected block and the next projected block have motion vectors substantially different from that of the target block, occlusion detector 107 may determine that the target block is a combined (covered-and-uncovered) target block.

Specifically, occlusion detector 107 may determine a first distance value between the motion vector of the target block and the motion vector of the next projected block. Occlusion detector 107 may also determine a second distance value between the motion vector of the target block and the motion vector of the previous projected block. Occlusion detector 107 may detect an occlusion type of the target block based on the first distance value and the second distance value.

For example, responsive to the first distance value being greater than the upper distance threshold and the second distance value being smaller than the lower distance threshold (e.g., when a covered occlusion condition is satisfied), occlusion detector 107 may determine that the target block is a covered target block. In another example, responsive to the first distance value being smaller than the lower distance threshold and the second distance value being greater than the upper distance threshold (e.g., when an uncovered occlusion condition is satisfied), occlusion detector 107 may determine that the target block is an uncovered target block. In still another example, responsive to both the first distance value and the second distance value being greater than the upper distance threshold (e.g., when a combined occlusion condition is satisfied), occlusion detector 107 may determine that the target block is a combined target block. Otherwise (e.g., when none of the covered occlusion condition, the uncovered occlusion condition, and the combined occlusion condition is satisfied), occlusion detector 107 may determine that the target block is a normal target block. That is, occlusion detector 107 may detect an occlusion type of the target block using the following expression (4):

$$\text{block\_type} = \begin{cases} \text{covered} & \text{if } dist(CurMV, NextMV) > TH_L \text{ and } dist(CurMV, PrevMV) < TH_S \\ \text{uncovered} & \text{if } dist(CurMV, NextMV) < TH_S \text{ and } dist(CurMV, PrevMV) > TH_L \\ \text{covered-and-uncovered} & \text{if } dist(CurMV, NextMV) > TH_L \text{ and } dist(CurMV, PrevMV) > TH_L \\ \text{normal} & \text{otherwise} \end{cases} \quad (4)$$

In the above expression (4), dist denotes a distance function between two motion vectors (e.g., CurMV and NextMV, or CurMV and PrevMV). CurMV denotes the motion vector of the target block. PrevMV denotes the motion vector of the previous projected block in the previous frame. NextMV denotes the motion vector of the next projected block in the next frame. $TH_L$ and $TH_S$ denote the upper distance threshold and the lower distance threshold, respectively.

In the above expression (4), a "covered" result indicates that the target block is a covered target block, and represents a case when a matched reference block of the target block can be found in the previous frame while no matched reference block of the target block can be found in the next frame. An "uncovered" result indicates that the target block is an uncovered target block, and represents a case when a matched reference block of the target block can be found in the next frame while no matched reference block of the target block can be found in the previous frame. A "coveredand-uncovered" result indicates that the target block is a combined target block, and represents a case when no matched reference block of the target block can be found in either the previous frame or the next frame. A "normal" result indicates that the target block is a normal target block, and represents a case when two matched reference blocks of the target block can be found in the previous frame and the next frame, respectively (e.g., there is no occlusion in the target block).

By performing operations like those described above, occlusion detector 107 may detect an occlusion type of each target block from a plurality of target blocks in target frame 204. As a result, occlusion detector 107 may determine one or more normal target blocks, one or more covered target blocks, one or more uncovered target blocks, and/or one or more combined target blocks from the plurality of target blocks. Then, occlusion detector 107 may determine an occlusion region and/or a non-occluded region (e.g., a normal region) in target frame 204. The normal region may include the one or more normal target blocks. The occlusion region may include a covered occlusion region including the one or more covered target blocks, an uncovered occlusion region including the one or more uncovered target blocks, and/or a combined occlusion region including the one or more combined target blocks.

Motion compensation module 109 may be configured to receive the normal region and/or the occlusion region detected for target frame 204 from occlusion detector 107. Motion compensation module 109 may generate target frame 204 based on the detected normal region and/or the detected occlusion region of target frame 204. For example, adaptive motion compensation based on the occlusion type may be performed to generate target frame 204 after the occlusion detection. When the occlusion (e.g., a covered or uncovered occlusion) occurs, adaptive selection of reference blocks from one or more of the previous frame and the next frame can be performed for motion compensation of the occlusion region.

In some embodiments, for each target block of target frame 204, motion compensation module 109 may generate the target block by performing a motion compensation method adaptively selected based on the occlusion type of the target block. Specifically, based on the occlusion type of the target block, motion compensation module 109 may determine one or more reference blocks for the target block from one or more of the previous frame and the next frame, respectively. Motion compensation module 109 may perform a motion compensation operation to generate the target block based on the one or more reference blocks.

Specifically, responsive to the target block being a covered target block, motion compensation module 109 may select a motion compensation operation that determines a matched reference block from the previous frame based on a winner motion vector of the target block. For example, a motion vector fwdMV of the target block derived from a forward motion estimation process can be selected as a winner motion vector winMV for the target block. A matched reference block for the target block can be found in the previous frame along a motion trajectory of the winner motion vector winMV from the target block. For example, the matched reference block can be a reference block from the previous frame, which is obtained by projecting the target block to the previous frame using the winner motion vector winMV.

Motion compensation module 109 may perform a motion compensation operation to generate the target block based on the matched reference block. The matched reference block can be used for unidirectional motion compensation of the target block. For example, motion compensation module 109 may generate image content of the target block based on image content of the matched reference block in the previous frame (e.g., the image content of the target block can be identical to the image content of the matched reference block). By performing similar operations to each target block in a covered occlusion region, motion compensation module 109 may generate image content for the covered occlusion region.

Alternatively, responsive to the target block being an uncovered target block, motion compensation module 109 may select a motion compensation operation that determines a matched reference block from the next frame based on the winner motion vector of the target block. For example, for each target block in an uncovered occlusion region of target frame 204, a motion vector bwdMV derived from a backward motion estimation process may be selected as a winner motion vector winMV for the target block. A matched reference block for the target block can be found in the next frame along a motion trajectory of the winner motion vector winMV from the target block. For example, the matched reference block can be a reference block from the next frame, which is obtained by projecting the target block to the next frame using the winner motion vector winMV.

Motion compensation module 109 may perform a motion compensation operation to generate the target block based on the matched reference block. The matched reference block can be used for unidirectional motion compensation of the target block. For example, motion compensation module 109 may generate image content of the target block based on image content of the matched reference block in the next frame. By performing similar operations to each target block in the uncovered occlusion region, motion compensation module 109 may generate image content for the covered occlusion region.

Alternatively, responsive to the target block being a combined target block, no matched reference block can be found for the target block from the previous frame or the next frame. Instead, motion compensation module 109 may select a motion compensation operation that determines a previous collocated block from the previous frame and a next collocated block from the next frame. Motion compensation module 109 may perform a motion compensation operation to generate the target block based on the previous collocated block and the next collocated block.

For example, for each target block in a combined occlusion region, a bi-directional motion compensation process can be performed using a zero-motion vector, such that a previous collocated block from the previous frame and a next collocated block from the next frame can be used for motion compensation of the target block. This represents a blending strategy to make an average on the previous collocated block and the next collocated block. For example, the target block can be derived by a weighted average of the previous collocated block and the next collocated block. By performing similar operations to each target block in the combined occlusion region, motion compensation module 109 may generate image content for the combined occlusion region.

Consistent with the disclosure described herein, the previous collocated block and the next collocated block can be two reference blocks from the previous frame and the next frame, respectively, which are obtained by projecting the target block to the previous frame and the next frame, respectively, using a zero-motion vector. A location of the previous (or next) collocated block in the previous (or next) frame is the same as a location of the target block in target frame 204.

Alternatively, responsive to the target block being a normal target block, motion compensation module 109 may determine a first matched reference block from the previous frame and a second matched reference block from the next frame based on the winner motion vector of the target block. In this case, the winner motion vector can be a bilateral motion vector of the target block derived from a bilateral motion estimation process. For example, for each target block in the normal region of target frame 204, a first matched reference block and a second matched reference block for the target block can be obtained respectively from the previous frame and the next frame along a motion trajectory of the bilateral motion vector (with the target block locating in the middle of the motion trajectory). That is, the first and second matched reference blocks can be two reference blocks from the previous frame and the next frame, respectively, which are obtained by projecting the target block to the previous frame and the next frame, respectively, using the bilateral motion vector.

Motion compensation module 109 may perform a motion compensation operation to generate the target block based on the first and second matched reference blocks. The first and second matched reference blocks can be used for bi-directional motion compensation of the target block. For example, motion compensation module 109 may generate image content of the target block through a weighted average operation on image content of the first matched reference block and image content of the second matched reference block. By performing similar operations to each target block in the normal region, motion compensation module 109 may generate image content for the normal region.

In some embodiments, motion compensation module 109 may generate image content for target frame 204 by aggregating the image content for the covered occlusion region, the image content for the uncovered occlusion region, the image content for the combined occlusion region, and/or the image content for the normal region. As a result, target frame 204 can be generated and interpolated into the sequence of image frames of the video at a position between the previous frame and the next frame.

Figure 3:
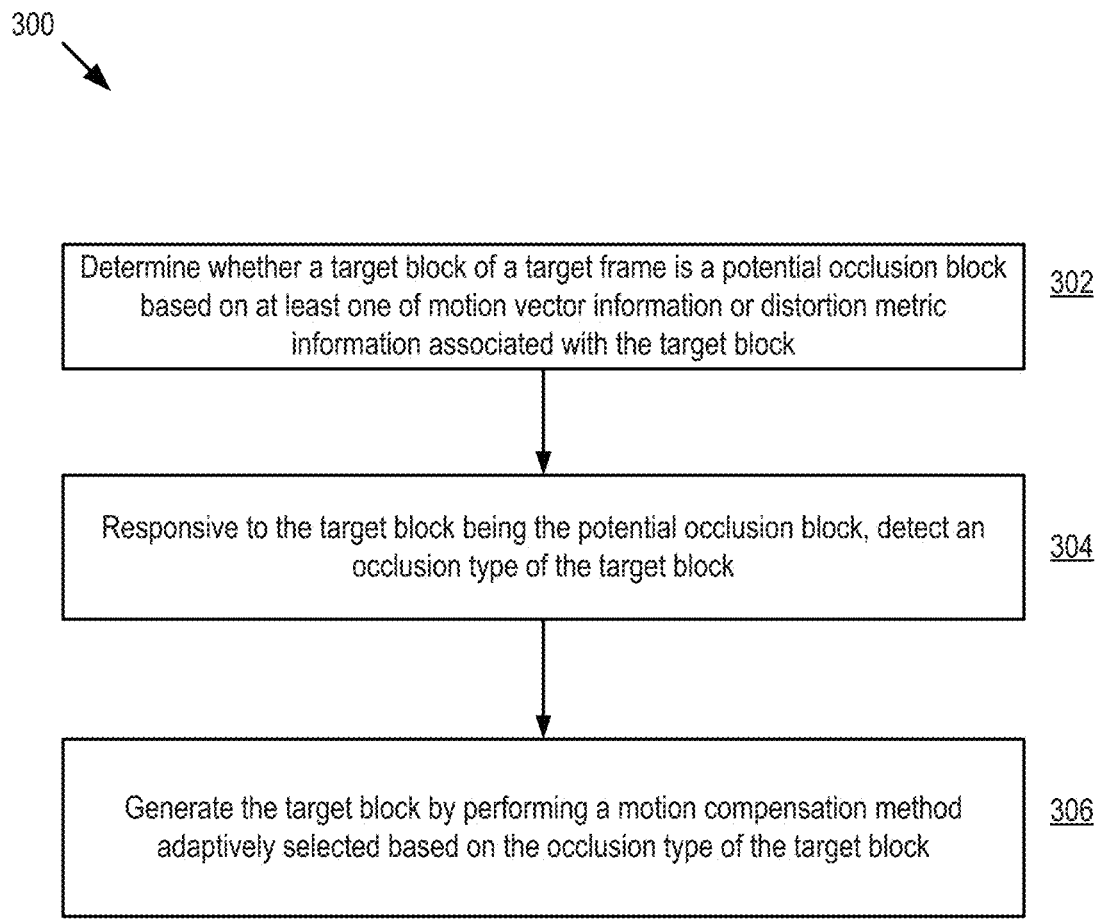
FIG. 3 is a flow chart of an exemplary method for performing occlusion detection in FRUC of video data, according to embodiments of the disclosure.

FIG. 3 is a flow chart of an exemplary method 300 for performing occlusion detection in FRUC of video data, according to embodiments of the disclosure. Method 300 may be implemented by system 101, specifically motion estimation module 105, occlusion detector 107, and motion compensation module 109, and may include steps 302-306 as described below. Some of the steps may be optional to perform the disclosure provided herein. Further, some of the steps may be performed simultaneously, or in a different order than shown in FIG. 3.

In some embodiments, the video data may include a sequence of image frames, and a target frame is to be generated and interpolated into the sequence of image frames.

In step 302, motion estimation module 105 determines whether a target block of the target frame is a potential occlusion block based on at least one of motion vector information or distortion metric information associated with the target block. For example, operations like those described below with reference to FIG. 5 may be implemented to perform step 302 of FIG. 3.

In step 304, responsive to the target block being the potential occlusion block, occlusion detector 107 may detect an occlusion type of the target block. For example, operations like those described below with reference to FIG. 6 may be implemented to perform step 304 of FIG. 3.

In step 306, motion compensation module 109 may generate the target block by performing a motion compensation method adaptively selected based on the occlusion type of the target block. For example, motion compensation module 109 may determine, based on the occlusion type of the target block, one or more reference blocks for the target block from one or more of a previous frame and a next frame, respectively. Motion compensation module 109 may select a motion compensation operation suitable for the determined occlusion type of the target block. Motion compensation module 109 may then perform the selected motion compensation operation to generate the target block based on the one or more reference blocks.

Figure 4:
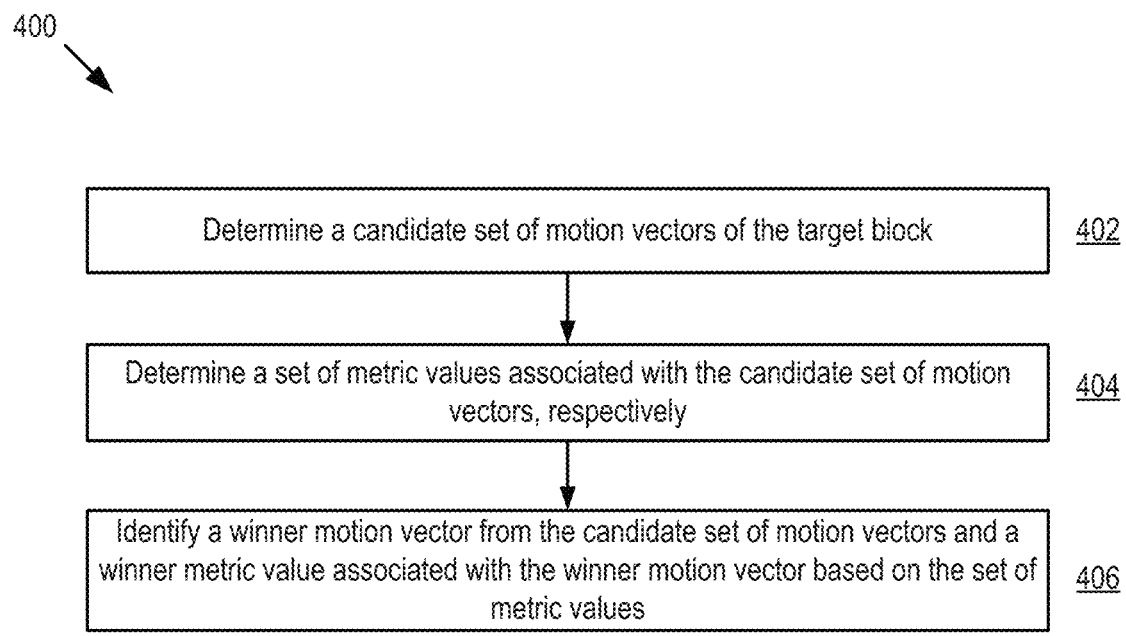
FIG. 4 is a flow chart of an exemplary method for determining motion vector information and distortion metric information associated with a target block, according to embodiments of the disclosure.

FIG. 4 is a flow chart of an exemplary method 400 for determining motion vector information and distortion metric information associated with a target block, according to embodiments of the disclosure. Method 400 may be implemented by system 101, specifically motion estimation module 105, and may include steps 402-406 as described below. Some of the steps may be optional to perform the disclosure provided herein. Further, some of the steps may be performed simultaneously, or in a different order than shown in FIG. 4.

In some embodiments, the motion vector information may include a winner motion vector of the target block, and the distortion metric information may include a winner metric value associated with the winner motion vector.

In step 402, motion estimation module 105 may determine a candidate set of motion vectors of the target block.

In step 404, motion estimation module 105 may determine a set of metric values associated with the candidate set of motion vectors, respectively.

In step 406, motion estimation module 105 may identify a winner motion vector from the candidate set of motion vectors and a winner metric value associated with the winner motion vector based on the set of metric values.

More details for performing steps 402-406 are described above in connection with descriptions of motion estimation module 105, and will not be repeated here.

Figure 5:
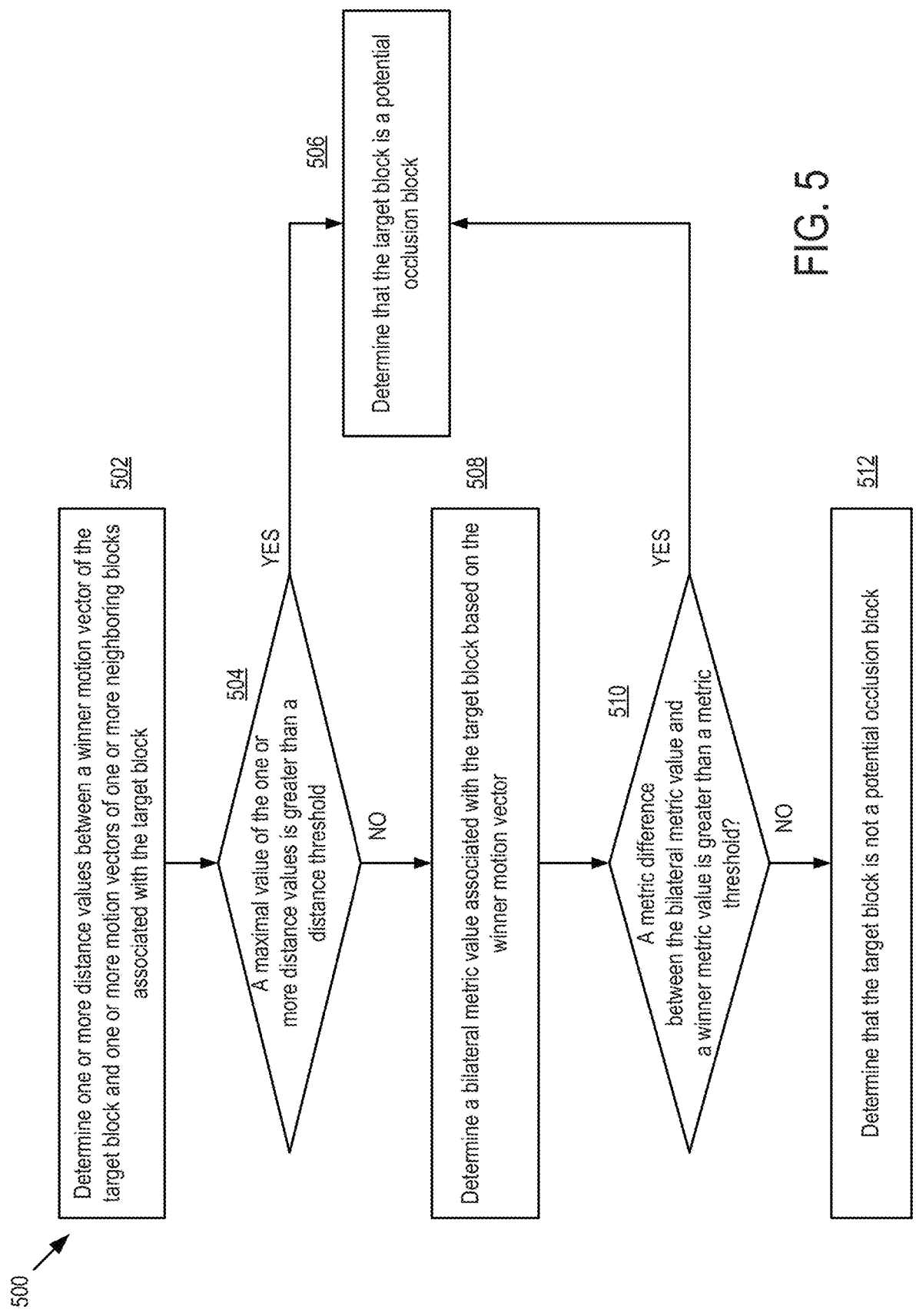
FIG. 5 is a flow chart of an exemplary method for determining whether a target block of a target frame is a potential occlusion block, according to embodiments of the disclosure.

FIG. 5 is a flowchart of an exemplary method 500 for determining whether a target block of a target frame is a potential occlusion block, according to embodiments of the disclosure. Method 500 may be implemented by system 101, specifically occlusion detector 107, and may include steps 502-512 as described below. Method 500 may be performed to implement step 302 of FIG. 3. Some of the steps may be optional to perform the disclosure provided herein. Further, some of the steps may be performed simultaneously, or in a different order than shown in FIG. 5.

In step 502, occlusion detector 107 may determine one or more distance values between a winner motion vector of the target block and one or more motion vectors of one or more neighboring blocks associated with the target block.

In step 504, occlusion detector 107 may determine whether a maximal value of the one or more distance values is greater than a distance threshold. Responsive to the maximal value of the one or more distance values being greater than the distance threshold (step 504: YES), method 500 proceeds to step 506. Otherwise (step 504: NO), method 500 proceeds to step 508.

In step 506, occlusion detector 107 may determine that the target block is a potential occlusion block.

In step 508, occlusion detector 107 may determine a bilateral metric value associated with the target block based on the winner motion vector.

In step 510, occlusion detector 107 may determine whether a metric difference between the bilateral metric value and a winner metric value associated with the winner motion vector is greater than a metric threshold. Responsive to the metric difference between the bilateral metric value and the winner metric value being greater than the metric threshold (step 510: YES), method 500 proceeds to step 506. Otherwise (step 510: NO), method 500 proceeds to step 512.

In step 512, occlusion detector 107 may determine that the target block is not a potential occlusion block.

More details for performing steps 502-512 are described above in connection with descriptions of occlusion detector 107, and will not be repeated here.

Figure 6:
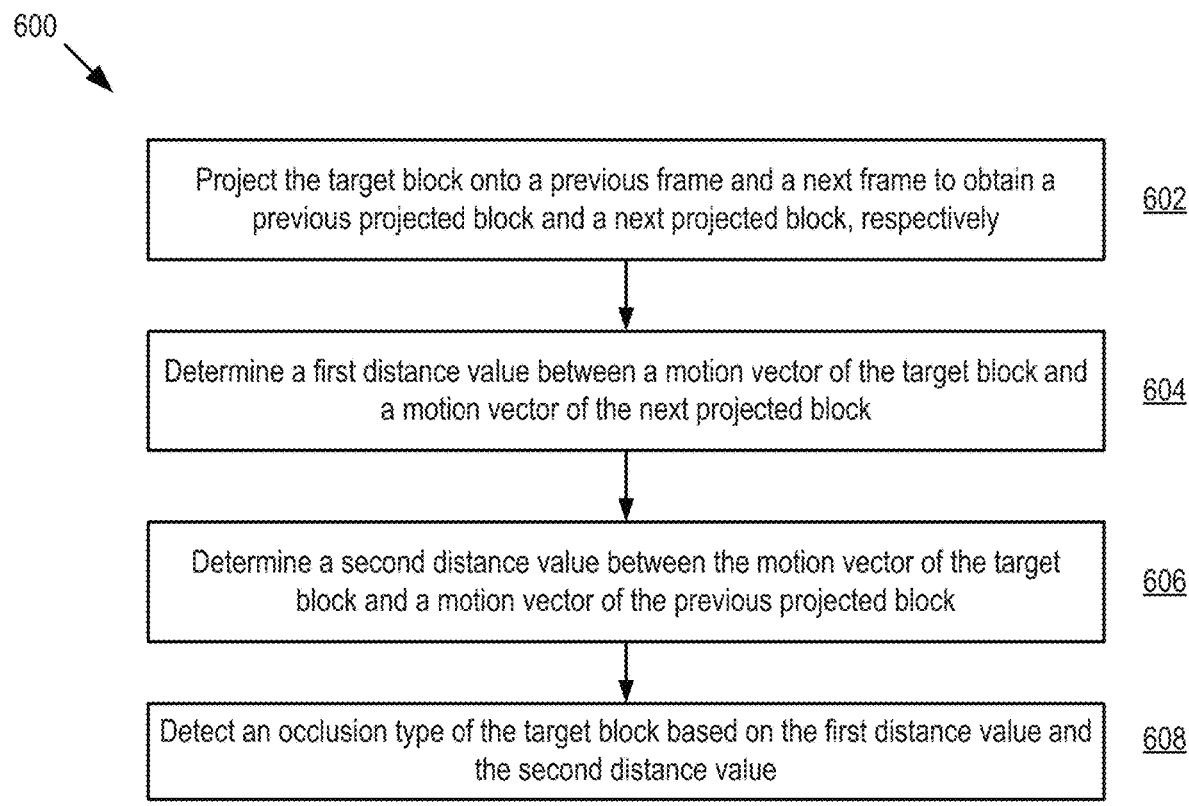
FIG. 6 is a flow chart of an exemplary method for detecting an occlusion type of a target block, according to embodiments of the disclosure.

FIG. 6 is a flow chart of an exemplary method 600 for detecting an occlusion type of a target block, according to embodiments of the disclosure. Method 600 may be implemented by system 101, specifically occlusion detector 107, and may include steps 602-608 as described below. Method 600 may be performed to implement step 304 of FIG. 3. Some of the steps may be optional to perform the disclosure provided herein. Further, some of the steps may be performed simultaneously, or in a different order than shown in FIG. 6.

In step 602, occlusion detector 107 may project the target block onto a previous frame and a next frame to obtain a previous projected block and a next projected block, respectively.

In step 604, occlusion detector 107 may determine a first distance value between a motion vector of the target block and a motion vector of the next projected block.

In step 606, occlusion detector 107 may determine a second distance value between the motion vector of the target block and a motion vector of the previous projected block.

In step 608, occlusion detector 107 may detect an occlusion type of the target block based on the first distance value and the second distance value.

More details for performing steps 602-608 are described above in connection with descriptions of occlusion detector 107, and will not be repeated here.

Figure 7:
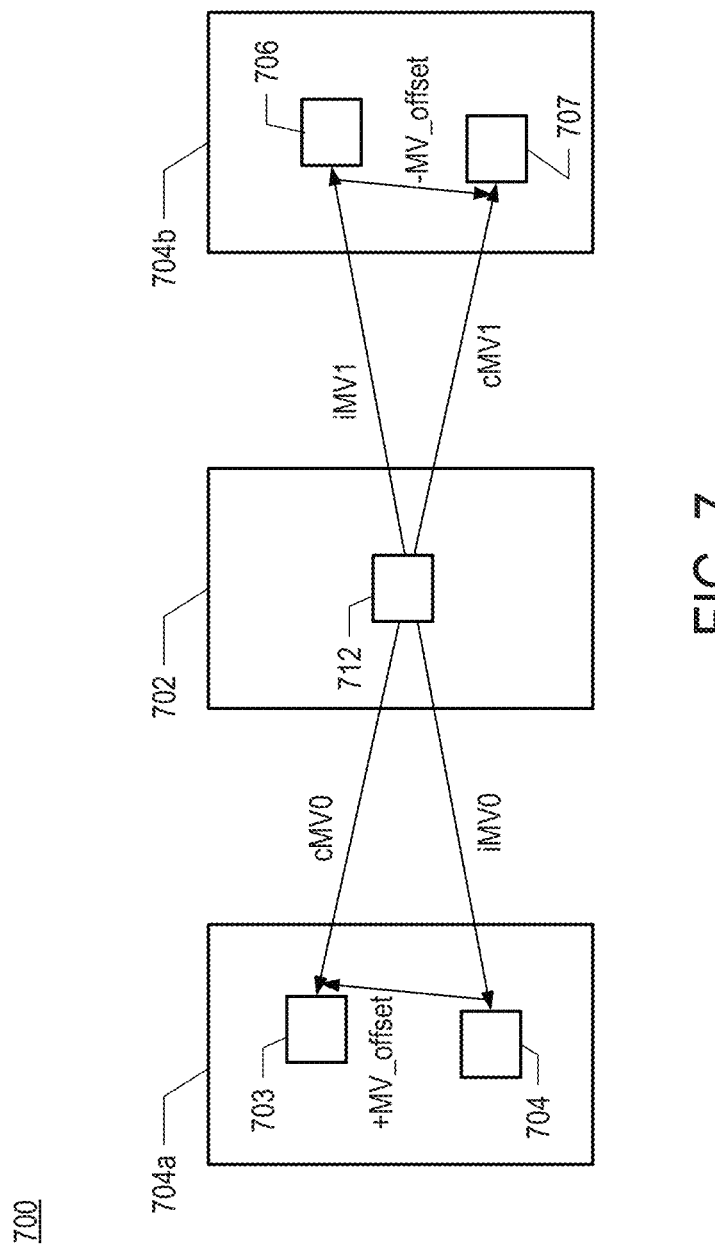
FIG. 7 is a graphical representation illustrating a bilateral motion estimation process, according to embodiments of the disclosure.

FIG. 7 is a graphical representation illustrating a bilateral motion estimation process 700, according to embodiments of the disclosure. In some embodiments, a block matching scheme as well as an optical flow scheme can be used to estimate motion vectors of a target frame, and the target frame can be interpolated along a motion trajectory of the motion vectors. The block matching scheme can be easily designed with low computational complexity. The block matching scheme may include a bilateral motion estimation process, a forward motion estimation process, or a backward motion estimation process, etc.

The bilateral motion estimation process disclosed herein may be performed for each target block in the target frame to obtain a motion vector of the target block relative to a previous frame and a motion vector of the target block relative to a next frame. In some embodiments, the previous and next frames can be two reference frames closest to the target frame. For example, the previous frame can be a reference frame immediately preceding the target frame with respect to a display order (or time order), and the next frame can be a reference frame immediately subsequent to the target frame with respect to the display order (or time order). In some other embodiments, the previous frame can be any reference frame preceding the target frame, and the next frame can be any reference frame subsequent to the target frame, which is not limited in the disclosure herein.

Referring to FIG. 7, motion estimation module 105 may use the bilateral motion estimation process to determine motion vectors of a target block 712 of a target frame 702 relative to a previous frame 704a and a next frame 704b. Specifically, motion estimation module 105 may perform a bilateral matching search process in previous frame 704a and next frame 704b to determine a set of preliminary motion vectors for target block 712. The set of preliminary motion vectors may include a first pair of preliminary motion vectors and one or more second pairs of preliminary motion vectors surrounding the first pair of preliminary motion vectors. For example, the first pair of preliminary motion vectors may include an initial preliminary motion vector (iMV0) relative to previous frame 704a and an initial preliminary motion vector (iMV1) relative to next frame 704b. An exemplary second pair of preliminary motion vectors may include a preliminary motion vector (cMV0) relative to previous frame 704a and a preliminary motion vector (cMV1) relative to next frame 704b.

Preliminary motion vectors in each pair can be symmetrical. For example, in the first pair, the initial preliminary motion vector (iMV0) pointing to previous frame 704a can be an opposite of the initial preliminary motion vector (iMV1) pointing to next frame 704b. In the second pair, the preliminary motion vector (cMV0) pointing to previous frame 704a can be an opposite of the preliminary motion vector (cMV1) pointing to next frame 704b. A difference between the initial preliminary motion vector iMV0 and the preliminary motion vector cMV0 can be referred to as a motion vector offset and denoted as MV_offset. For example, the following expressions (5)-(7) can be established for the bilateral motion estimation process:

$$cMV0 = -cMV1, \qquad (5)$$

$$cMV0 = iMV0 + MV\_offset, \qquad (6)$$

$$cMV1 = iMV1 - MV\_offset. \qquad (7)$$

For each pair of preliminary motion vectors, two corresponding reference blocks (e.g., a corresponding previous block and a corresponding next block) can be located from previous frame 704a and next frame 704b, respectively. For example, for the first pair of preliminary motion vectors (iMV0 and iMV1), a previous block 704 and a next block 706 can be located for target block 712 from previous frame 704a and next frame 704b, respectively. For the second pair of preliminary motion vectors (cMV0 and cMV1), a previous block 703 and a next block 707 can be located for target block 712 from previous frame 704a and next frame 704b, respectively.

Next, for each pair of preliminary motion vectors (iMV0 and iMV1, or cMV0 and cMV1), a metric value (e.g., a SAD value) between the two corresponding reference blocks can be determined. Then, a pair of preliminary motion vectors that has a lowest or smallest metric value (e.g., a lowest SAD value) can be determined, and considered as motion vectors of target block 712 relative to previous frame 704a and next frame 704b using the bilateral motion estimation process.

It is contemplated that a distortion metric is used herein when determining motion vectors of target block 712 relative to previous and next frames 704a and 704b, so that the determined motion vectors can have the best match between two corresponding reference blocks in previous and next frames 704a and 704b. Examples of the distortion metric used herein may include, but are not limited to, the following: a SAD metric, a mean square error (MSE) metric, or a mean absolute distortion (MAD) metric.

FIG. 8A is a graphical representation illustrating a forward motion estimation process 800, according to embodiments of the disclosure. FIG. 8B is a graphical representation illustrating a backward motion estimation process 850, according to embodiments of the disclosure. Either the forward motion estimation process or the backward motion estimation process disclosed herein may be performed for each target block in a target frame to obtain a motion vector of the target block relative to a previous frame and a motion vector of the target block relative to a next frame. In each of the forward and backward motion estimation processes, different reference blocks are searched only in one of the two reference frames (e.g., either the previous frame or the next frame), while a fixed reference block is used in the other one of the two reference frames.

In some embodiments, in the forward motion estimation process shown in FIG. 8A, a next block 818 of a next frame 804b that is collocated with a target block 812 of a target frame 802 is used as a fixed corresponding reference block for target block 812, while different previous blocks (e.g., including previous blocks 814, 816) in a previous frame 804a are selected as corresponding reference blocks for target block 812. A metric value (e.g., a SAD value) between next block 818 in next frame 804b and each of the different previous blocks in previous frame 804a can be determined. Then, a previous block that has a lowest metric value can be selected from the different previous blocks, and a motion vector pointing from next block 818 to the selected previous block can be determined and referred to as $MV_{orig\_FW}$. For example, if previous block 816 has a lowest metric value when compared with other previous blocks, the motion vector $MV_{orig\_FW}$ can be a motion vector 840 pointing from next block 818 to previous block 816.

The motion vector $MV_{orig\_FW}$ can be scaled to obtain a motion vector of target block 812 relative to previous frame 804a based on a temporal distance between previous frame 804a and target frame 802 and a temporal distance between previous frame 804a and next frame 804b. Consistent with the disclosure provided herein, a temporal distance between a first frame and a second frame can be measured as a temporal distance between time stamps (or display orders) of the first frame and the second frame. For example, a motion vector of target block 812 relative to previous frame 804a can be calculated by expressions (8)-(9):

$$MV_{P1}(x)=MV_{orig\_FW}(x)*(T_{P1}-T_{target})/(T_{P1}-T_{N1}), \quad (8)$$

$$MV_{P1}(y)=MV_{orig\_FW}(y)*(T_{P1}-T_{target})/(T_{P1}-T_{N1}). \quad (9)$$

$MV_{P1}(x)$ and $MV_{P1}(y)$ denote an x component and a y component of the motion vector of target block 812 relative to previous frame 804a, respectively. $MV_{orig\_FW}(x)$ and $MV_{orig\_FW}(y)$ denote an x component and a y component of the motion vector $MV_{orig\_FW}$, respectively. $T_{P1}$, $T_{N1}$, and $T_{target}$ denote a time stamp or display order of previous frame 804a, next frame 804b, and target frame 802, respectively. $(T_{P1}-T_{target})$ and $(T_{P1}-T_{N1})$ denote the temporal distance between previous frame 804a and target frame 802 and the temporal distance between previous frame 804a and next frame 804b, respectively.

Then, the motion vector $MV_{orig\_FW}$ can also be scaled to obtain a motion vector of target block 812 relative to next frame 804b based on a temporal distance between next frame 804b and target frame 802 and the temporal distance between previous frame 804a and next frame 804b. For example, the motion vector of target block 812 relative to next frame 804b can be calculated by expressions (10)-(11):

$$MV_{N1}(x)=MV_{orig\_FW}(x)*(T_{N1}-T_{target})/(T_{P1}-T_{N1}), \quad (10)$$

$$MV_{N1}(y)=MV_{orig\_FW}(y)*(T_{N1}-T_{target})/(T_{P1}-T_{N1}). \quad (11)$$

$MV_{N1}(x)$ and $MV_{N1}(y)$ denote an x component and a y component of the motion vector of target block 812 relative to next frame 804b, respectively. $(T_{N1}-T_{target})$ denotes the temporal distance between next frame 804b and target frame 802.

In some embodiments, in the backward motion estimation process shown in FIG. 8B, a previous block 862 of previous frame 804a that is collocated with a target block 852 of target frame 802 is used as a fixed corresponding reference block for target block 812, while different next blocks (e.g., including next blocks 864, 866) in next frame 804b are used as corresponding reference blocks for target block 812. A metric value between previous block 862 in previous frame 804a and each of the different next blocks in next frame 804b can be determined. Then, a next block that has a lowest metric value can be selected from the different next blocks, and a motion vector pointing from previous block 862 to the selected next block can be determined and referred to as $MV_{orig\_BW}$. For example, if next block 866 has a lowest metric value when compared with other next blocks, the motion vector $MV_{orig\_BW}$ can be a motion vector 880 pointing from previous block 862 to next block 866.

The motion vector $MV_{orig\_BW}$ can be scaled to obtain a motion vector of target block 812 relative to next frame 804b based on a temporal distance between next frame 804b and target frame 802 and a temporal distance between next frame 804b and previous frame 804a. For example, the motion vector of target block 812 relative to next frame 804b can be calculated by expressions (12)-(13):

$$MV_{N1}(x)=MV_{orig\_BW}(x)*(T_{N1}-T_{target})/(T_{N1}-T_{P1}), \quad (12)$$

$$MV_{N1}(y)=MV_{orig\_BW}(y)*(T_{N1}-T_{target})/(T_{N1}-T_{P1}). \quad (13)$$

$MV_{orig\_BW}(x)$ and $MV_{orig\_BW}(y)$ denote an x component and a y component of motion vector $MV_{orig\_BW}$, respectively. Next, the motion vector $MV_{orig\_BW}$ can also be scaled to obtain a motion vector of target block 812 relative to previous frame 804a based on a temporal distance between previous frame 804a and target frame 802 and a temporal distance between next frame 804b and previous frame 804a. For example, the motion vector of target block 812 relative to previous frame 804a can be calculated by expressions (14)-(15):

$$MV_{P1}(x)=MV_{orig\_BW}(x)*(T_{P1}-T_{target})/(T_{N1}-T_{P1}), \quad (14)$$

$$MV_{P1}(y)=MV_{orig\_BW}(y)*(T_{P1}-T_{target})/(T_{N1}-T_{P1}). \quad (15)$$

It is contemplated that, when determining motion vectors for a target block using the motion estimation processes described in FIGS. 7 and 8A-8B, bias values can also be used in addition to distortion metrics mentioned above so that a more consistent motion vector field can be derived. For example, a spatial correlation between the target block and its neighboring target blocks can be taken into consideration, as well as a temporal correlation between the target block and its collocated reference blocks in the reference frames. Bias values may be calculated based on the differences between a preliminary motion vector of the target block and motion vectors from those neighboring target blocks and collocated reference blocks. The bias values may be incorporated into the metric value (e.g., the SAD value)

to determine an overall cost. A preliminary motion vector with a lowest overall cost can be determined as a motion vector for the target block.

Figure 9:
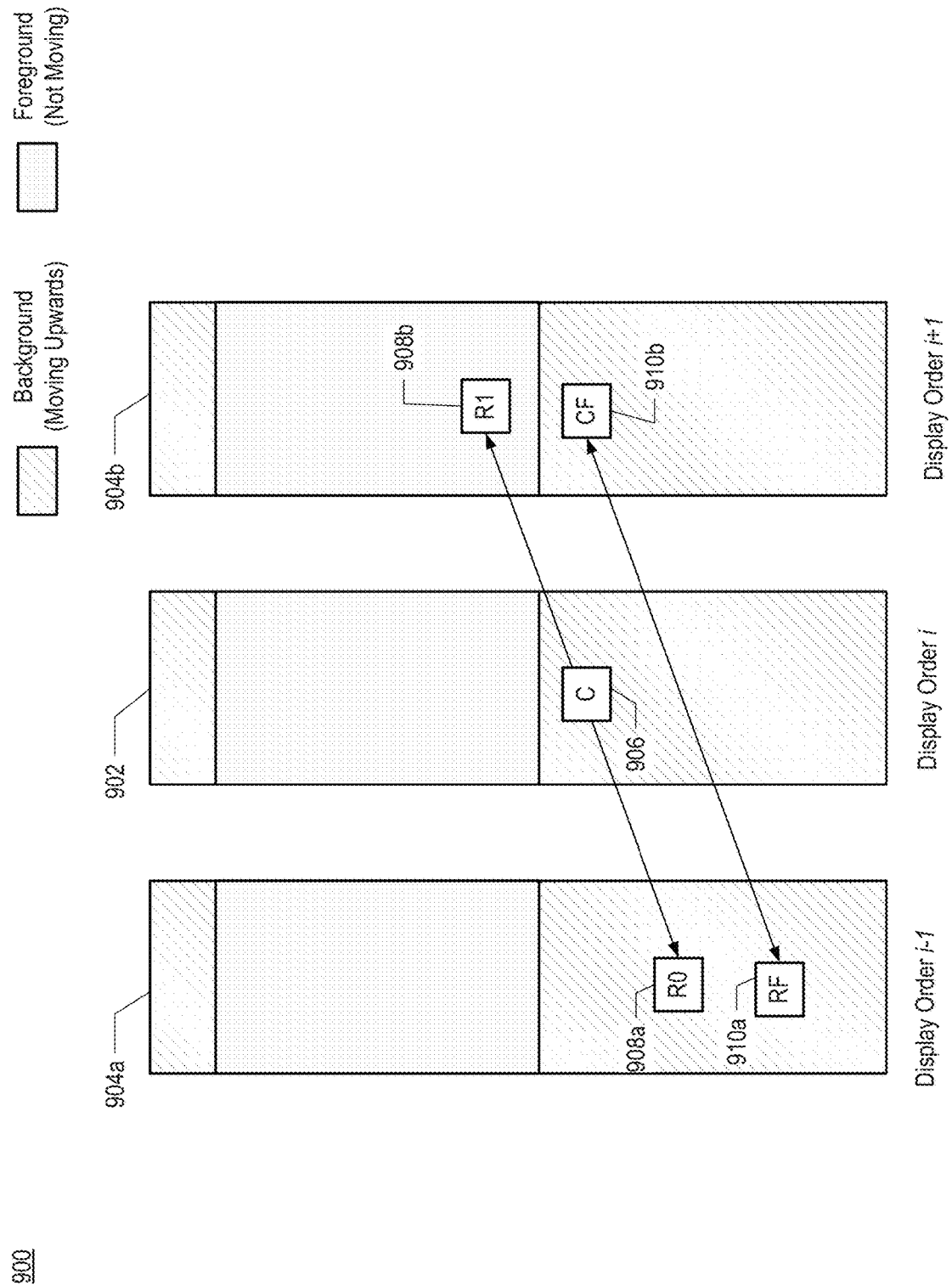
FIG. 9 is a graphical representation illustrating an exemplary process for detecting a potential occlusion region, according to embodiments of the disclosure.

FIG. 9 is a graphical representation illustrating an exemplary process 900 for detecting a potential occlusion region of a target frame, according to embodiments of the disclosure. FIG. 9 include a target frame 902 with a display order of i, a previous frame 904a with a display order of i−1, and a next frame 904b with a display order of i+1. Each of target frame 902, previous frame 904a, and next frame 904b includes a background and a foreground. The background has non-zero motion (e.g., moving upwards with a velocity from a block, e.g., 910a, to another block, e.g., 910b). The foreground has zero motion (e.g., not moving).

FIG. 9 shows an example of occlusion where a reference block 908a ("R0") in the background of previous frame 904a is covered by foreground in next frame 904b. In this example, a target block 906 ("C") in target frame 902 has a matched reference block in previous frame 904a, which is reference block 908a. Reference block 908a belongs to the background which moves upward, and the content of reference block 908a is covered by foreground at a block 908b ("R1") in next frame 904b.

For target block 906, neither a bilateral motion estimation process nor a backward motion estimation process can be used in locating a correct motion vector for the block due to occlusion. The correct motion vector of target block 906 may be derived through a forward motion estimation process using a collocated reference block 910b ("CF") of target block 906 in next frame 904b, and a true matching reference block 910a ("RF") in previous frame 904a can be found for collocated reference block 910b. A location of the collocated reference block 910b in next frame 904b is the same as a location of target block 906 in target frame 902. The correct motion vector of target block 906 can be a winner motion vector of target block 906.

For example, assuming that motion vectors of target block 906 derived through the forward motion estimation process and the backward motion estimation process are fwdMV and bwdMV respectively, and their associated metric values such as SAD values are $SAD_{fwd}$ and $SAD_{bwd}$, respectively. $SAD_{fwd}$ is likely to be smaller than $SAD_{bwd}$ due to the occlusion in the backward motion estimation process in which only a best-effort matching (not a true matching) block may be located. By comparing the two SAD values ($SAD_{fwd}$ and $SAD_{bwd}$), a winner motion vector that offers a smaller SAD value may be selected for target block 906. In this example, a winner motion vector winMV and a winner metric value winSAD for target block 906 can be fwdMV and $SAD_{fwd}$, respectively.

Next, by applying the winner motion vector winMV to target block 906 in a bilateral manner, a bilateral metric value (e.g., a bilateral SAD value ctSAD) may be calculated for target block 906. For example, two mirroring reference blocks 908a and 908b ("R0" and "R1") may be determined from previous frame 904a and next frame 904b, respectively, along a motion trajectory of the winner motion vector winMV using target block 906 as a central point. The bilateral metric value (ctSAD) may be calculated as an SAD value between mirroring reference blocks 908a and 908b. In this case, the bilateral metric value (ctSAD) is between different objects (background block 908a and foreground block 908b), and may be larger than the winner metric value (winSAD). Comparison of ctSAD and winSAD may be performed to determine whether target block 906 is a potential occlusion block using the above expression (1) or (3).

By performing similar operations to a plurality of target blocks in target frame 902, respectively, one or more potential occlusion blocks may be determined in target frame 902. A potential occlusion region of target frame 902 may be determined to include the one or more potential occlusion blocks.

Figure 10A:
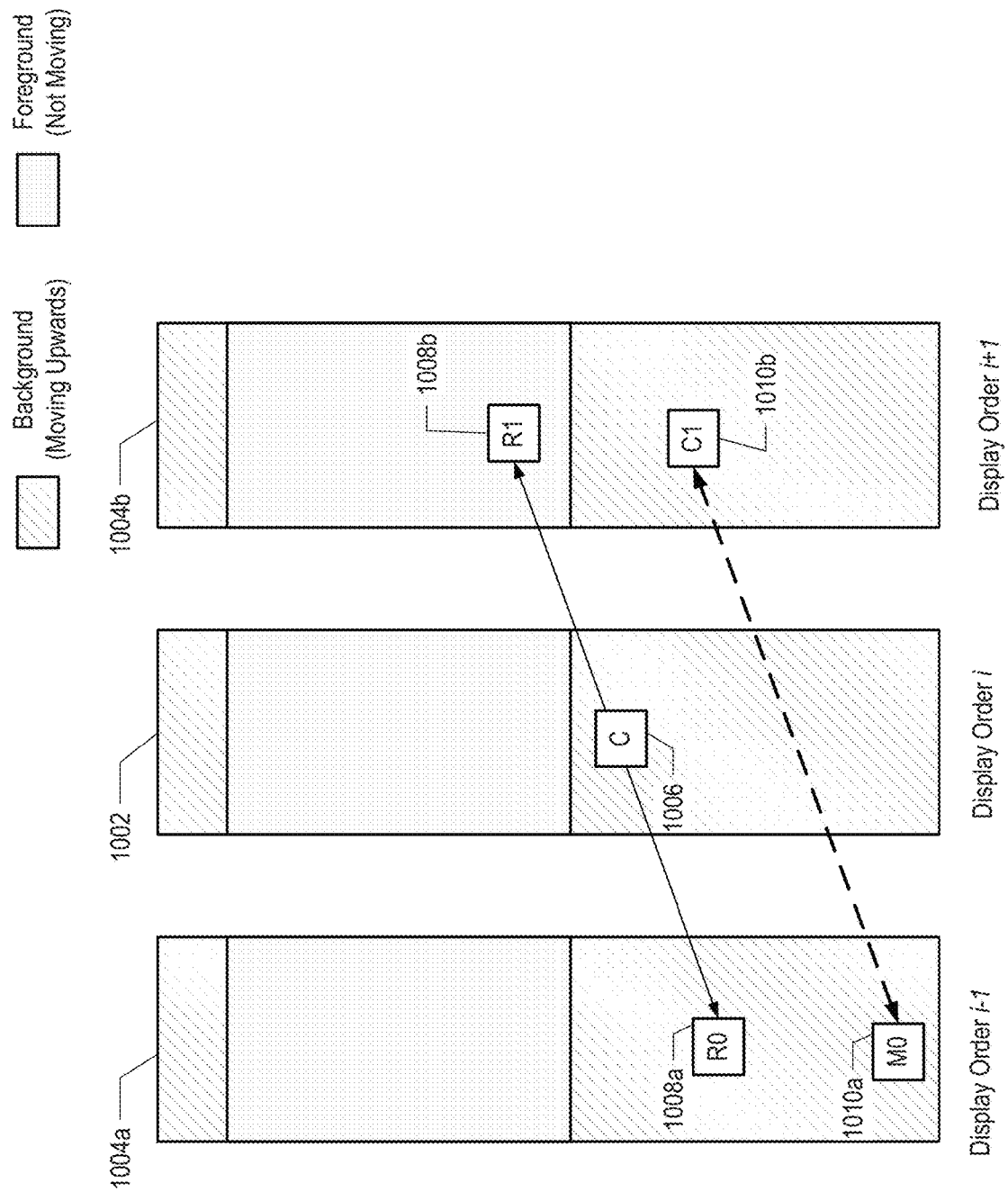
FIG. 10A is a graphical representation illustrating an exemplary covered block in a target frame, according to embodiments of the disclosure.

FIG. 10A is a graphical representation illustrating an exemplary covered block in a target frame, according to embodiments of the disclosure. FIG. 10A include a target frame 1002 with a display order of i, a previous frame 1004a with a display order of i−1, and a next frame 1004b with a display order of i+1. Each of target frame 1002, previous frame 1004a, and next frame 1004b includes a background and a foreground. The background has non-zero motion (e.g., moving upwards with a velocity from a block 1010a ("M0") to a block 1010b ("C1")). The foreground has zero motion (e.g., not moving).

A target block 1006 ("C") in target frame 1002 may have a motion vector CurMV. A previous projected block 1008a ("R0") and a next projected block 1008b ("R1") can be obtained for target block 1006 by projecting target block 1006 onto previous frame 1004a and next frame 1004b using the motion vector CurMV, respectively. Previous projected block 1008a may have a motion vector PrevMV, and next projected block 1008b may have a motion vector NextMV. An occlusion type of target block 1006 may be determined based on the motion vector CurMV of target block 1006, the motion vector PrevMV of previous projected block 1008a, and the motion vector NextMV of next projected block 1008b. In the example shown in FIG. 10A, target block 1006 may be determined to be a covered target block.

Figure 10B:
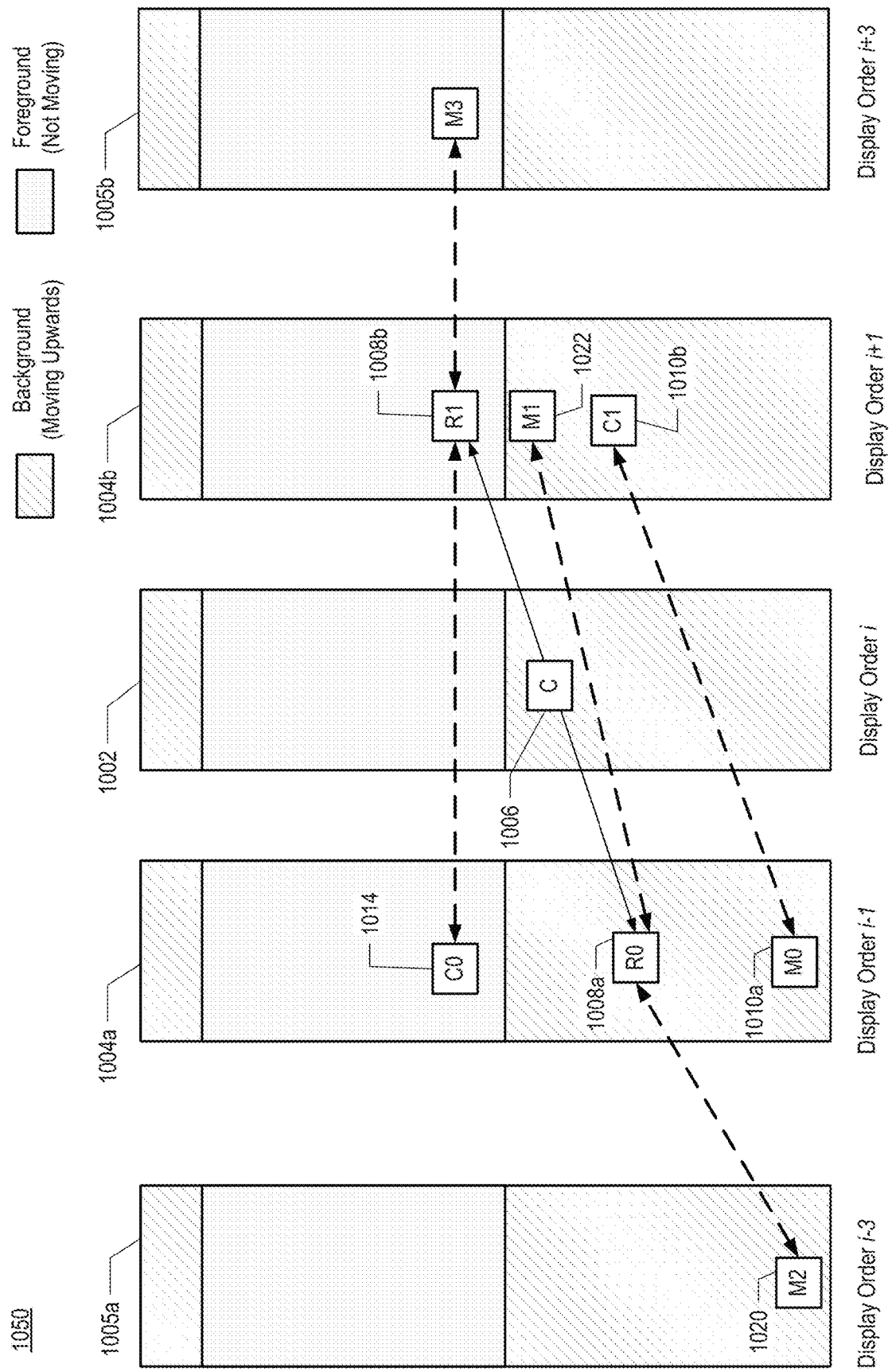
FIG. 10B is graphical representation illustrating an exemplary process for determining motion vectors of projected reference blocks, according to embodiments of the disclosure.

FIG. 10B is graphical representation illustrating a process 1050 for determining motion vectors of projected reference blocks, according to embodiments of the disclosure. FIG. 10B may include elements like those of FIG. 10A, and the similar descriptions will not be repeated here. FIG. 10B may further include (1) another previous frame 1005a with a display order of i−3 prior to previous frame 1004a and (2) another next frame 1005b with a display order of i+3 after next frame 1004b. Each of target frame 1002, previous frames 1004a and 1005a, next frames 1004b and 1005b includes a background and a foreground. The background has non-zero motion (e.g., moving upwards with a velocity from block 1010a to block 1010b). The foreground has zero motion (e.g., not moving). The projected reference blocks of target block 1006 in FIG. 10B may include previous projected block 1008a and next projected block 1008b.

The motion vector of each projected reference block (e.g., the motion vector PrevMV of previous projected block 1008a or the motion vector NextMV of next projected block 1008b) may be derived using various motion estimation methods. For example, the motion vector of each projected reference block may be derived using a backward motion estimation process or a forward motion estimation process.

In some embodiments, the motion vector of each projected reference block may be derived through a motion estimation process using previous frame 1004a and next frame 1004b. For example, as shown in FIG. 10B, the motion vector PrevMV of previous projected block 1008a may be estimated through a backward motion estimation process (e.g., from previous projected block 1008a in previous frame 1004a to its most similar block 1022 ("M1") in next frame 1004b). Alternatively, the motion vector PrevMV of previous projected block 1008a may be estimated through a forward motion estimation process (e.g., from block 1010b in next frame 1004b to block 1010b's true matching block 1010a in previous frame 1004a). Block 1010b can be a collocated reference block of previous projected block 1008a in next frame 1004b. Similarly, the motion vector NextMV of next projected block 1008b may be estimated through a forward motion estimation process (e.g., from next projected block 1008b in next frame 1004b to next projected block 1008b's true matching block 1014 ("C0") in previous frame 1004a).

In some embodiments, the motion vector of each projected reference block may be derived through a motion estimation process using multiple previous frames and multiple next frames. For example, as shown in FIG. 10B, previous frames 1004a and 1005a and next frames 1004b and 1005b can be used in a motion estimation process to determine the motion vector of each projected reference block. In this case, the motion vector of each projected reference block can be derived more accurately using information of more reference frames. For example, the motion vector PrevMV of previous projected block 1008a may be estimated through a forward motion estimation process (e.g., from previous projected block 1008a in previous frame 1004a to previous projected block 1008a's true matching block 1020 ("M2") in previous frame 1005a).

In some embodiments, for each projected reference block, a set of motion vectors associated with a set of neighboring blocks of the projected reference block may be used to obtain an estimation of the motion vector of the projected reference block, so that robustness of the motion estimation process can be improved. An operation (e.g., an "average" operation, a "median" operation, etc.) may be performed on the set of motion vectors associated with the set of neighboring blocks to derive the motion vector of the projected reference block. For example, as shown in FIG. 10B, motion vectors of neighboring blocks of previous projected block 1008a in previous frame 1004a may be used together to derive the motion vector PrevMV of previous projected block 1008a. For example, the motion vector PrevMV of previous projected block 1008a can be an average or a median of the motion vectors of the neighboring blocks of previous projected block 1008a. Likewise, motion vectors of neighboring blocks of next projected block 1008b in next frame 1004b may be used together to derive the motion vector NextMV of next projected block 1008b.

It is contemplated that methods to derive the motion vector of the projected reference block are not limited to those described above and any other suitable motion estimation method can be used. For example, various optical-flow-based motion estimation methods may also be used to derive the motion vector. The detection and handling of an occlusion region in a target frame disclosed herein may be performed regardless of what motion estimation methods are used to estimate the motion vector.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor-based, tape-based, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

The invention claimed is:

1. A computer-implemented method for performing occlusion detection in frame rate up-conversion of video data including a sequence of image frames, comprising:
   determining, by a video processor, whether a target block of a target frame is a potential occlusion block based on at least one of motion vector information or distortion metric information associated with the target block, wherein the target frame is to be generated and interpolated into the sequence of image frames; and
   responsive to the target block being the potential occlusion block, detecting, by the video processor, an occlusion type of the target block; and
   generating, by the video processor, the target block by performing a motion compensation method adaptively selected based on the occlusion type of the target block.

2. The computer-implemented method of claim 1, wherein the motion vector information comprises a winner motion vector of the target block, and the distortion metric information comprises a winner metric value associated with the winner motion vector.

3. The computer-implemented method of claim 2, further comprising determining the at least one of the motion vector information or the distortion metric information associated with the target block.

4. The computer-implemented method of claim 3, wherein determining the at least one of the motion vector information or the distortion metric information comprises:
   determining a candidate set of motion vectors of the target block;
   determining a set of metric values associated with the candidate set of motion vectors, respectively; and
   identifying, based on the set of metric values, the winner motion vector from the candidate set of motion vectors and the winner metric value associated with the winner motion vector.

5. The computer-implemented method of claim 4, wherein identifying, based on the set of metric values, the winner motion vector from the candidate set of motion vectors and the winner metric value associated with the winner motion vector comprises:
   determining a minimal metric value from the set of metric values;
   identifying the winner motion vector to be a motion vector associated with the minimal metric value from the candidate set of motion vectors; and
   identifying the winner metric value to be the minimal metric value.

6. The computer-implemented method of claim 2, wherein determining whether the target block is the potential occlusion block based on the at least one of the motion vector information or the distortion metric information comprises:
   determining one or more motion vectors of one or more neighboring blocks associated with the target block;
   determining one or more distance values between the winner motion vector of the target block and the one or more motion vectors of the one or more neighboring blocks, respectively; and responsive to a maximal value of the one or more distance values being greater than a distance threshold, determining that the target block is the potential occlusion block.

7. The computer-implemented method of claim 2, wherein determining whether the target block is the potential occlusion block based on the at least one of the motion vector information or the distortion metric information comprises:
determining a bilateral metric value associated with the target block based on the winner motion vector;
determining whether a metric difference between the bilateral metric value and the winner metric value is greater than a metric threshold; and
responsive to the metric difference being greater than the metric threshold, determining that the target block is the potential occlusion block.

8. The computer-implemented method of claim 7, wherein determining the bilateral metric value associated with the target block based on the winner motion vector comprises:
applying the winner motion vector in a bilateral manner to obtain a previous mirroring block for the target block from a previous frame prior to the target frame and a next mirroring block for the target block from a next frame subsequent to the target frame; and
determining the bilateral metric value based on the previous mirroring block and the next mirroring block.

9. The computer-implemented method of claim 2, wherein the winner metric value comprises a sum of absolute differences (SAD) value, a mean square error (MSE) value, or a mean absolute distortion (MAD) value.

10. The computer-implemented method of claim 1, wherein detecting the occlusion type of the target block further comprising determining that the target block is one of a covered target block, an uncovered target block, or a combined target block.

11. The computer-implemented method of claim 10, wherein detecting the occlusion type of the target block further comprises:
projecting the target block onto a previous frame prior to the target frame and a next frame subsequent to the target frame to obtain a previous projected block and a next projected block, respectively; and
detecting the occlusion type of the target block based on a motion vector of the target block, a motion vector of the previous projected block, and a motion vector of the next projected block.

12. The computer-implemented method of claim 11, wherein detecting the occlusion type of the target block based on the motion vector of the target block, the motion vector of the previous projected block, and the motion vector of the next projected block comprises:
determining a first distance value between the motion vector of the target block and the motion vector of the next projected block;
determining a second distance value between the motion vector of the target block and the motion vector of the previous projected block; and
detecting the occlusion type of the target block based on the first distance value and the second distance value.

13. The computer-implemented method of claim 12, wherein detecting the occlusion type of the target block based on the first distance value and the second distance value comprises:
responsive to the first distance value being greater than an upper distance threshold and the second distance value being smaller than a lower distance threshold, determining that the target block is the covered target block.

14. The computer-implemented method of claim 12, wherein detecting the occlusion type of the target block based on the first distance value and the second distance value comprises:
responsive to the first distance value being smaller than a lower distance threshold and the second distance value being greater than an upper distance threshold, determining that the target block is the uncovered target block.

15. The computer-implemented method of claim 12, wherein detecting the occlusion type of the target block based on the first distance value and the second distance value comprises:
responsive to both the first distance value and the second distance value being greater than an upper distance threshold, determining that the target block is the combined target block.

16. The computer-implemented method of claim 1, wherein generating the target block by performing the motion compensation method adaptively selected based on the occlusion type of the target block comprises:
determining, based on the occlusion type of the target block, one or more reference blocks for the target block from one or more of a previous frame prior to the target frame and a next frame subsequent to the target frame, respectively; and
performing a motion compensation operation to generate the target block based on the one or more reference blocks.

17. The computer-implemented method of claim 16, wherein the one or more reference blocks comprise a matched reference block for the target block, and determining, based on the occlusion type of the target block, the one or more reference blocks for the target block comprises:
responsive to the target block being a covered target block, determining the matched reference block from the previous frame based on a winner motion vector of the target block; or
responsive to the target block being an uncovered target block, determining the matched reference block from the next frame based on the winner motion vector of the target block.

18. The computer-implemented method of claim 16, wherein determining, based on the occlusion type of the target block, the one or more reference blocks for the target block comprises:
responsive to the target block being a combined target block, determining a previous collocated block from the previous frame and a next collocated block from the next frame, the one or more reference blocks comprising the previous collocated block and the next collocated block.

19. A system for performing occlusion detection in frame rate up-conversion of video data including a sequence of image frames, comprising:
a memory configured to store the sequence of image frames; and
a video processor coupled to the memory and configured to:
determine whether a target block of a target frame is a potential occlusion block based on at least one of motion vector information or distortion metric information associated with the target block, wherein the target frame is to be generated and interpolated into the sequence of image frames;

responsive to the target block being the potential occlusion block, detect an occlusion type of the target block; and generate the target block by performing a motion compensation method adaptively selected based on the occlusion type of the target block.

20. A non-transitory computer-readable storage medium configured to store instructions which, when executed by a video processor, cause the video processor to perform a process for performing occlusion detection in frame rate up-conversion of video data including a sequence of image frames, the process comprising:

determining whether a target block of a target frame is a potential occlusion block based on at least one of motion vector information or distortion metric information associated with the target block, wherein the target frame is to be generated and interpolated into the sequence of image frames;

responsive to the target block being the potential occlusion block, detecting an occlusion type of the target block; and generating the target block by performing a motion compensation method adaptively selected based on the occlusion type of the target block.

* * * * *